(12) United States Patent
Brija

(10) Patent No.: US 9,909,789 B2
(45) Date of Patent: Mar. 6, 2018

(54) HEATING AND COOLING UNIT WITH CANOPY LIGHT

(71) Applicant: Spring (U.S.A.) Corporation, Naperville, IL (US)

(72) Inventor: Francis Thomas Brija, Palm Beach Gardens, FL (US)

(73) Assignee: Spring (U.S.A.) Corporation, Naperville, IL (US)

( * ) Notice: Subject to any disclaimer, the term of this patent is extended or adjusted under 35 U.S.C. 154(b) by 33 days.

(21) Appl. No.: 15/211,841

(22) Filed: Jul. 15, 2016

(65) Prior Publication Data

US 2016/0324338 A1  Nov. 10, 2016

Related U.S. Application Data

(63) Continuation-in-part of application No. 14/471,949, filed on Aug. 28, 2014, now Pat. No. 9,416,995, which is a continuation of application No. 13/495,643, filed on Jun. 13, 2012, now Pat. No. 8,850,829, which is a continuation-in-part of application No. 13/347,229, filed on Jan. 10, 2012, now abandoned.

(51) Int. Cl.
| | | |
|---|---|---|
| A47F 10/00 | (2006.01) | |
| F25B 21/04 | (2006.01) | |
| F25B 33/00 | (2006.01) | |
| F21V 33/00 | (2006.01) | |
| A47J 36/26 | (2006.01) | |
| A47F 10/06 | (2006.01) | |

(52) U.S. Cl.
CPC .............. *F25B 21/04* (2013.01); *A47F 10/06* (2013.01); *A47J 36/26* (2013.01); *F21V 33/0036* (2013.01); *A47F 2010/065* (2013.01); *F25B 2321/023* (2013.01); *F25B 2321/0212* (2013.01); *F25B 2321/0252* (2013.01); *F25D 2400/08* (2013.01)

(58) Field of Classification Search
CPC .............. F25B 21/04; F25B 2321/0212; F25B 2321/023; F25B 2321/0252; A47F 10/00; A47F 10/06; A47F 2010/065; A47J 36/26; F21V 33/0036; F25D 2400/08
USPC .......................... 62/3.3, 3.7, 259.2; 165/185
See application file for complete search history.

(56) References Cited

U.S. PATENT DOCUMENTS

| | | |
|---|---|---|
| 2,084,883 A | 6/1937 | Atchinson |
| 2,677,365 A | 5/1954 | Beland |
| 2,759,339 A | 8/1956 | Kundert |

(Continued)

FOREIGN PATENT DOCUMENTS

WO   2011008280 A1   1/2011

*Primary Examiner* — Mohammad M Ali
(74) *Attorney, Agent, or Firm* — Banner & Witcoff, Ltd.

(57) ABSTRACT

Aspects of the disclosure herein relate to systems and methods for heating, cooling, and/or displaying food. A food display system may include a base; a support engaged with the base; a canopy supported by the support, the canopy having a top surface, a bottom surface, and an edge surface between the top and bottom surfaces, the edge surface having at least a first portion and a second portion; and a light source configured to provide light to the first portion of the edge surface of the canopy and illuminate the second portion of the edge surface of the canopy. The canopy may be configured to be located above a food item.

22 Claims, 26 Drawing Sheets

(56) References Cited

U.S. PATENT DOCUMENTS

| | | |
|---|---|---|
| 2,996,889 A | 8/1961 | Roeder |
| 2,997,040 A | 8/1961 | Bold |
| 3,516,485 A | 6/1970 | Mackay |
| 3,603,767 A | 9/1971 | Scicchitano |
| 3,823,307 A | 7/1974 | Weiss |
| 3,965,969 A | 6/1976 | Williamson |
| 3,999,601 A | 12/1976 | Spanoudis |
| 4,123,919 A | 11/1978 | Fehlhaber |
| 4,306,616 A | 12/1981 | Woods, Jr. et al. |
| 4,593,752 A | 6/1986 | Tipton |
| 4,823,554 A | 4/1989 | Trachtenberg et al. |
| 4,856,579 A | 8/1989 | Wolfe |
| 5,263,538 A | 11/1993 | Amid Ieu et al. |
| 5,653,111 A | 8/1997 | Attey et al. |
| 5,718,124 A | 2/1998 | Senecal |
| 5,771,788 A | 6/1998 | Lee et al. |
| 5,782,094 A | 7/1998 | Freeman |
| 5,878,579 A | 3/1999 | Boyer, III |
| 5,941,077 A | 8/1999 | Safyan |
| 5,966,940 A | 10/1999 | Gower et al. |
| 6,020,638 A | 2/2000 | Kobayashi |
| 6,026,647 A | 2/2000 | Coffee et al. |
| 6,085,535 A | 7/2000 | Richmond et al. |
| 6,220,338 B1 | 4/2001 | Grandi |
| 6,234,107 B1 | 5/2001 | Tanaka et al. |
| 6,279,470 B2 | 8/2001 | Simeray et al. |
| 6,295,820 B1 | 10/2001 | Cauchy et al. |
| 6,301,901 B1 | 10/2001 | Coffee et al. |
| 6,344,630 B1 | 2/2002 | Jarvis et al. |
| 6,619,045 B1 | 9/2003 | Clark |
| 6,691,894 B2 | 2/2004 | Chrisman et al. |
| 6,735,958 B2 | 5/2004 | Baumann |
| 6,976,371 B2 | 12/2005 | Gleason et al. |
| 7,216,500 B2 | 5/2007 | Schwichtenberg et al. |
| 7,242,000 B2 | 7/2007 | Archibald et al. |
| 7,309,830 B2 | 12/2007 | Zhang et al. |
| 7,426,835 B2 | 9/2008 | Bell et al. |
| 7,451,603 B2 | 11/2008 | Tuszkiewicz et al. |
| 7,665,311 B2 | 2/2010 | Steffensen et al. |
| 8,277,763 B2 | 10/2012 | Steinmann et al. |
| 8,839,633 B2 | 9/2014 | Quisenberry et al. |
| 2001/0013224 A1 | 8/2001 | Ohkubo et al. |
| 2001/0052409 A1 | 12/2001 | Miki |
| 2002/0184895 A1 | 12/2002 | Anderson et al. |
| 2003/0029174 A1 | 2/2003 | Lee |
| 2003/0141045 A1 | 7/2003 | Oh et al. |
| 2003/0192321 A1 | 10/2003 | Baumann |
| 2004/0025516 A1 | 2/2004 | Van Winkle |
| 2004/0134200 A1 | 7/2004 | Schroeder et al. |
| 2004/0171269 A1 | 9/2004 | Kondo et al. |
| 2004/0231997 A1* | 11/2004 | Wang ................ C23C 18/1628 205/143 |
| 2005/0045702 A1 | 3/2005 | Freeman et al. |
| 2005/0103212 A1 | 5/2005 | Cronin et al. |
| 2005/0257532 A1* | 11/2005 | Ikeda ...................... F25B 21/02 62/3.7 |
| 2005/0274118 A1 | 12/2005 | McMurry et al. |
| 2006/0005548 A1 | 1/2006 | Ruckstuhl |
| 2006/0191271 A1* | 8/2006 | Takahashi ............... F25B 21/04 62/3.7 |
| 2006/0232891 A1 | 10/2006 | Bushnik et al. |
| 2006/0237182 A1 | 10/2006 | Godecker et al. |
| 2006/0277924 A1 | 12/2006 | Platkin |
| 2007/0120137 A1 | 5/2007 | Wilson et al. |
| 2007/0227456 A1 | 10/2007 | Borey |
| 2008/0016881 A1 | 1/2008 | Steffensen et al. |
| 2008/0099186 A1 | 5/2008 | Yu et al. |
| 2008/0168795 A1 | 7/2008 | Alfille |
| 2008/0173566 A1 | 7/2008 | Lowenstein |
| 2008/0190119 A1 | 8/2008 | Smayling |
| 2009/0000310 A1 | 1/2009 | Bell et al. |
| 2009/0020269 A1 | 1/2009 | Chang et al. |
| 2009/0084526 A1 | 4/2009 | Chang et al. |
| 2009/0277187 A1 | 11/2009 | McGann |
| 2010/0043451 A1* | 2/2010 | Alahyari .................. A23L 3/16 62/3.3 |
| 2010/0050659 A1 | 3/2010 | Quisenberry et al. |
| 2010/0059880 A1 | 3/2010 | Baek |
| 2010/0081191 A1* | 4/2010 | Woods ...................... B01L 7/52 435/303.1 |
| 2010/0127089 A1 | 5/2010 | Sakami |
| 2010/0133355 A1 | 6/2010 | Park et al. |
| 2010/0186931 A1 | 7/2010 | Obara et al. |
| 2010/0198204 A1 | 8/2010 | Rogers |
| 2010/0269517 A1 | 10/2010 | Ikeda et al. |
| 2011/0072834 A1 | 3/2011 | Ishikura et al. |
| 2011/0073469 A1 | 3/2011 | Ma et al. |
| 2011/0194578 A1 | 8/2011 | Hirose et al. |
| 2011/0197598 A1 | 8/2011 | Cheng et al. |
| 2011/0203295 A1 | 8/2011 | Hsu et al. |
| 2011/0316571 A1 | 12/2011 | Kiyokawa et al. |
| 2012/0290023 A1 | 11/2012 | Boyden et al. |

\* cited by examiner

FIG. 1 (COOLING OPERATION)

FIG. 2 (HEATING OPERATION)

FIG. 3 (PELTIER DEVICE)

FIG. 4 (HEAT PIPE)

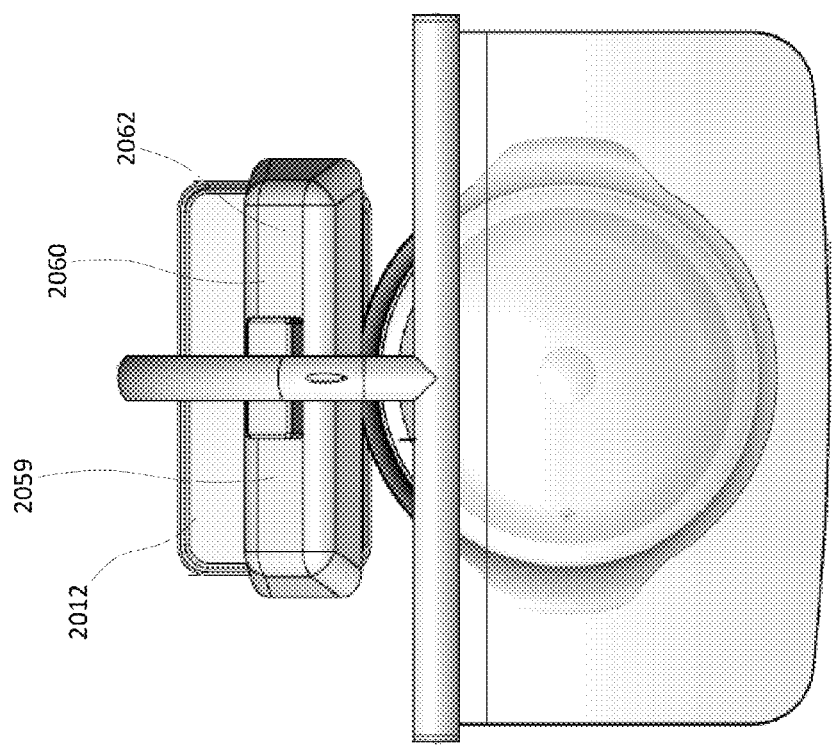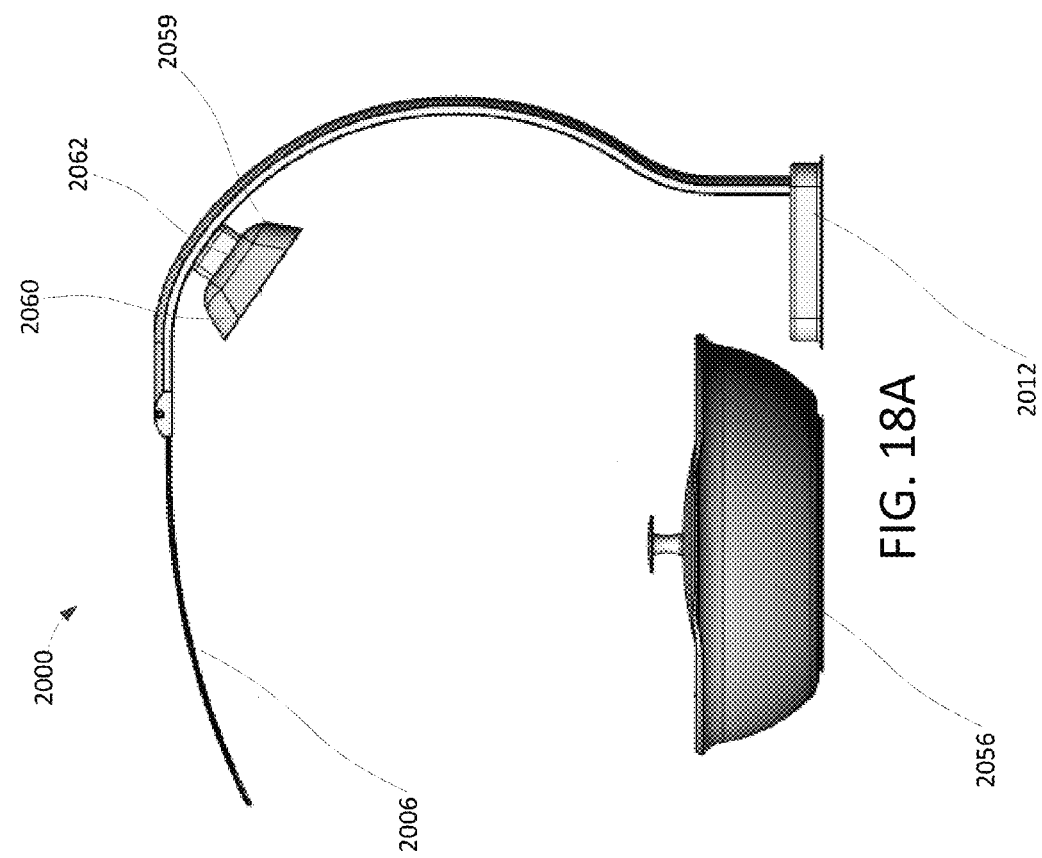

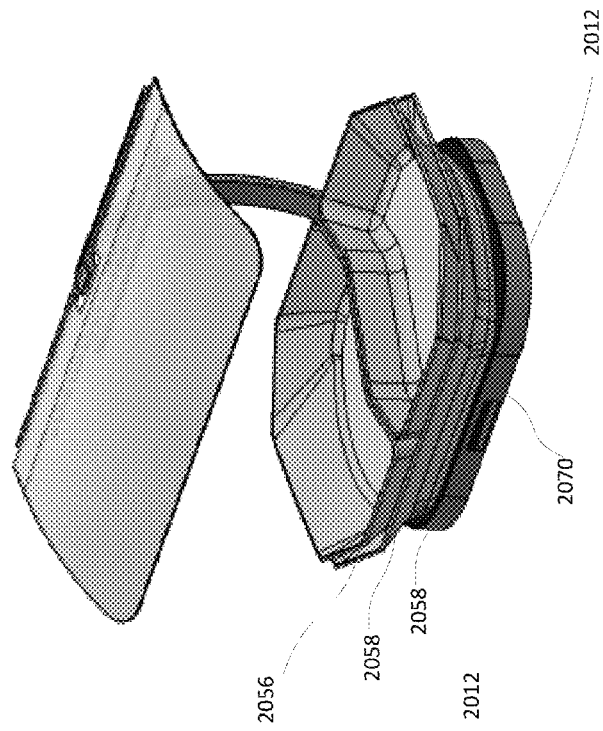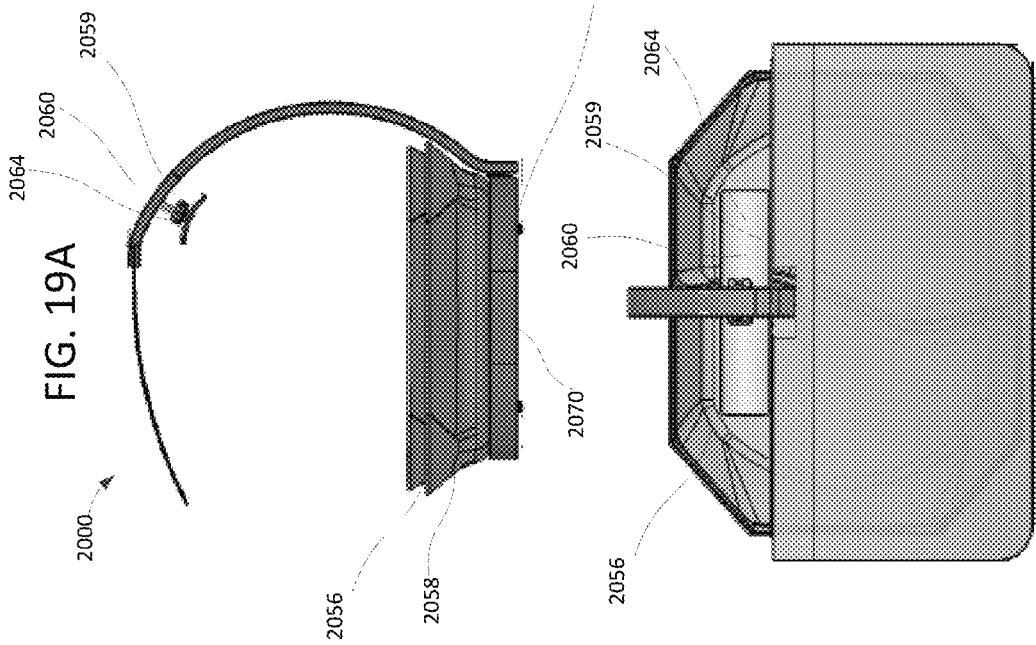

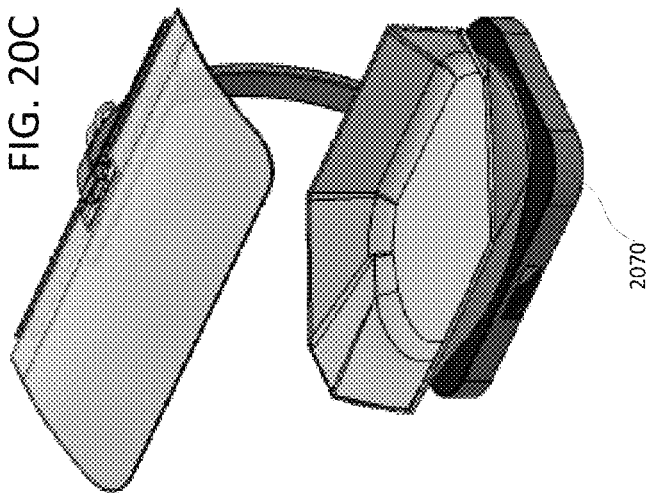
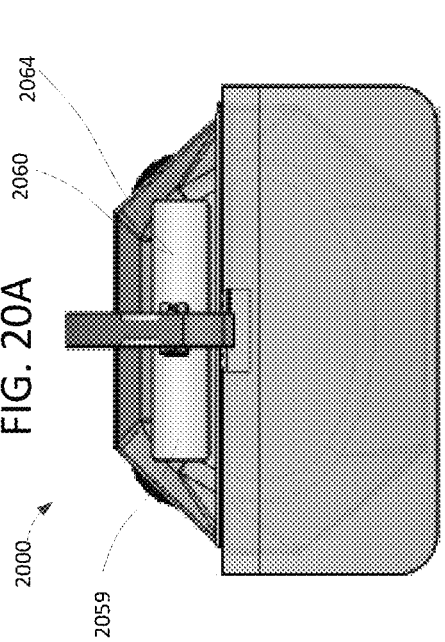
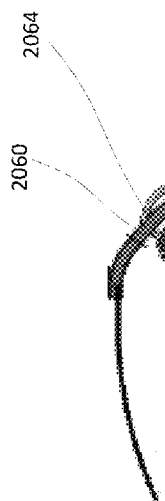

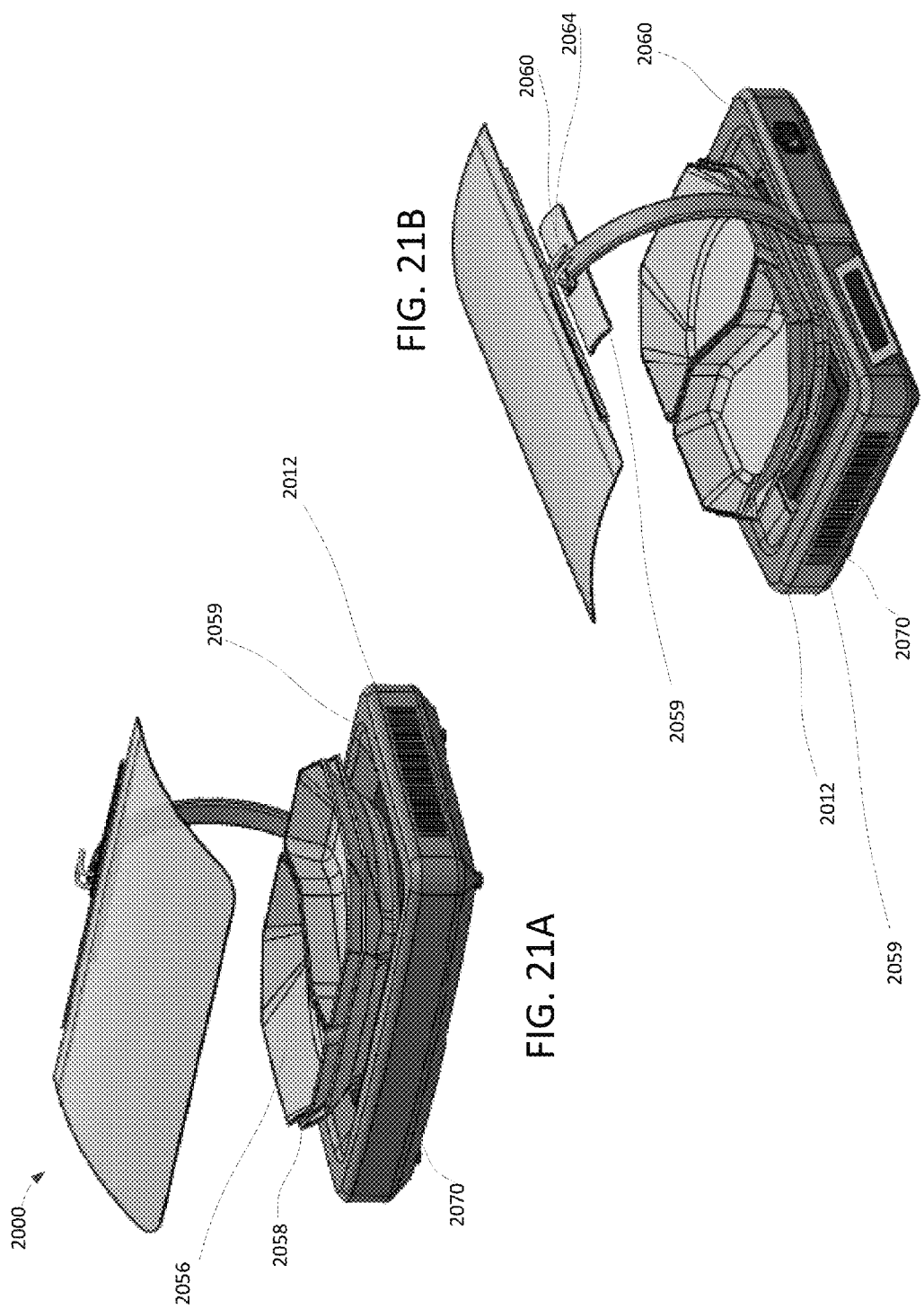

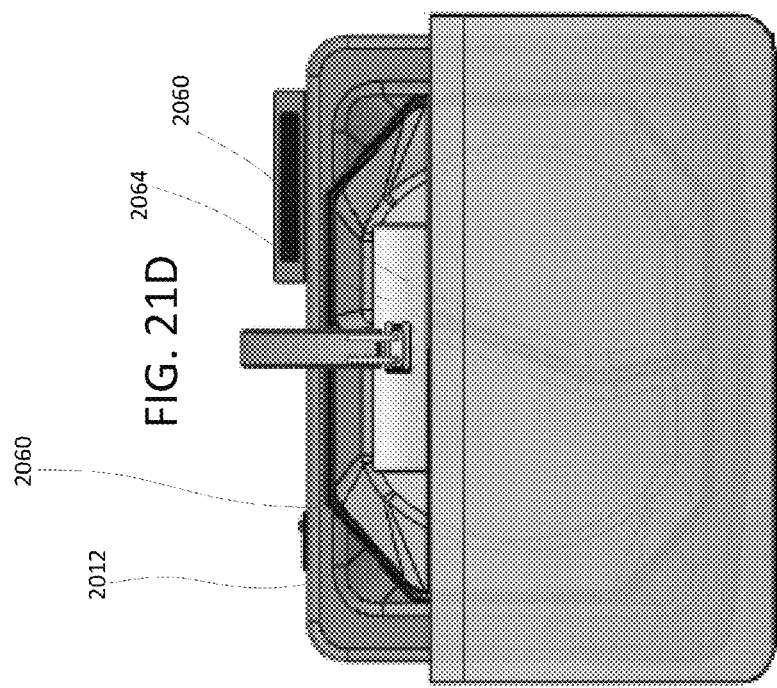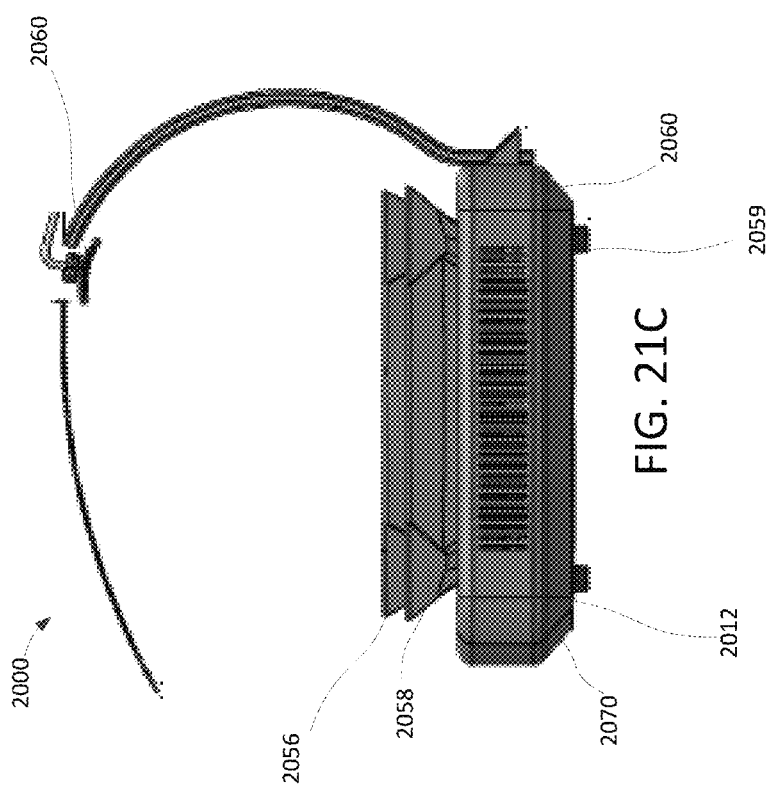

HEATING AND COOLING UNIT WITH CANOPY LIGHT

This application is a continuation-in-part of pending U.S. patent application Ser. No. 14/471,949 entitled "Heating and Cooling Unit With Semiconductor Device and Heat Pipe" and filed on Aug. 28, 2014, the entire disclosure of which is incorporated herein by reference, which is a continuation of U.S. patent application Ser. No. 13/495,643, entitled "Heating and Cooling Unit with Semiconductor Device and Heat Pipe" and filed on Jun. 13, 2012, the entire disclosure of which is hereby incorporated by reference, which is a continuation-in-part of U.S. patent application Ser. No. 13/347,229, entitled "Heating and Cooling Unit with Semiconductor Device and Heat Pipe" and filed on Jan. 10, 2012, the entire disclosure of which is hereby incorporated by reference.

TECHNICAL FIELD

Certain aspects of the disclosure relate to heating, warming, cooking, and/or serving food. In particular, certain aspects of the disclosure relate to food-serving systems, components thereof, and methods of serving food including heating and/or cooling the food, and lighting a canopy disposed above the food.

BACKGROUND

Restaurants and other food service establishments often make food items readily available to their customers via buffets, salad bars, breakfast bars, or similar set-ups allowing customers to serve themselves. To ensure the safety of certain food items, it is often necessary to ensure that the food items maintain a certain elevated temperature, and for other food items it is often desirable to serve the items at relatively warm or hot temperatures for the customer's enjoyment. Similarly, certain food items must be maintained at reduced temperatures for the safety of the food and/or for customer's enjoyment. At the same time, to further ensure sanitary conditions a "sneeze-guard" or "breath shield" type structure is often needed, if not required outright by health codes and regulations, between the customers and the food items to help prevent contamination of the food by bacteria or other germs.

While maintaining the sanitary condition of the food items, it is also desirable that the serving set-ups present the food items in a convenient, safe, and aesthetically pleasing manner. It is often desirable to fully display and illuminate the food items to increase their appeal to the customer, and therefore setups that partially or fully obstruct the customer's view of the food, for example through opaque components such as pan covers, or clear components that "fog up" and/or collect condensation from hot food items in a manner that obstructs a customer's view, may not be desirable even if they otherwise provide the necessary sanitation benefits.

To alleviate these possible inefficiencies, it may be desirable to provide food-serving systems and methods that maintain safe and sanitary conditions by heating food items and providing a barrier to prevent bacteria and germ contamination by customers, but do so in a manner that presents the food items in an appealing manner and allows customers to conveniently view and access any desired food items.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein relate to systems and methods for heating, cooling, and/or displaying food. In certain examples, this disclosure provides a food display system. The display system includes a base; a support engaged with the base; a canopy supported by the support, the canopy having a top surface, a bottom surface, and an edge surface between the top and bottom surfaces, the edge surface having at least a first portion and a second portion; and a light source configured to provide light to the first portion of the edge surface of the canopy and illuminate the second portion of the edge surface of the canopy. The canopy may be configured to be located above a food item.

The food display system of claim 1 may include a design etched into one of the top surface of the canopy or the bottom surface of the canopy, and the light source is configured to illuminate the design.

The food display system may also include a temperature change source configured to affect temperature of the food item. The temperature change source may be located substantially above the food item and may be configured to warm the food item. The light source may be configured to emit a red light when the temperature change source is on and the red light has a wavelength of about 600 nm to about 665 nm. The light source may be configured to emit a blue light when the temperature change source is off and the blue light may have a wavelength of about 430 nm to about 525 nm. The temperature change source may be an infrared light or a ceramic heater.

The temperature change source may also be located substantially below the food item. The temperature change source may comprise at least one cooling Peltier device configured to cool the food surface below an ambient temperature and at least one heating Peltier device configured to heat the food surface above the ambient temperature. The light source may be configured to light emit a blue light when the cooling Peltier device is activated and may be configured to emit a red light when the heating Peltier device is activated. The blue light may have a wavelength of about 430 nm to about 525 nm and the red light may have a wavelength of about 600 nm to about 665 nm.

In another example, a food display system may include a base, the base comprising: a top surface, the top surface comprising one or more serving surfaces supported by the base; and at least one Peltier device contained within the base and configured to change a temperature of at least one of the one or more serving surfaces; and a support engaged with the base; a canopy supported by the support, the canopy having a top surface, a bottom surface, and an edge surface between the top and bottom surfaces, the edge surface having at least a first portion and a second portion; and a light source configured to provide light to the first portion of the edge surface of the canopy and illuminate the second portion of the edge surface of the canopy.

The food display system may also include a first portable electrical source configured to provide electrical power to the at least one Peltier device and the at least one light source.

The light source may be configured to emit a red light and a blue light and the blue light may have a wavelength of about 430 nm to about 525 nm and the red light may have a wavelength of about 600 nm to about 665 nm.

The at least one cooling Peltier device may be configured to cool the food surface below an ambient temperature or heat the food surface above the ambient temperature.

The light source may be configured to emit a red light when the Peltier device is heating the food surface above the ambient temperature, and wherein the light source may be configured to emit a blue light when the Peltier device is cooling the food surface above the ambient temperature.

In other examples, the food display system may include a base; a support engaged with the base; a canopy supported by the support, the canopy having a top surface, a bottom surface, and an edge surface between the top and bottom surfaces, the edge surface having at least a first portion and a second portion; and a light source configured to provide light to the first portion of the edge surface of the canopy and illuminate the second portion of the edge surface of the canopy; a temperature change source configured to raise the temperature of the food item above an ambient temperature. The light source may be configured to emit a red light having a wavelength of about 600 nm to about 665 nm. The canopy may be configured to be located above a food item.

The temperature change source may also configured to lower the temperature of the food item below the ambient temperature; and the light source may also configured to emit a blue light having a wavelength of about 430 nm to about 525 nm.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

A more complete understanding of the present disclosure and the advantages thereof may be acquired by referring to the following description in consideration of the accompanying drawings, in which like reference numbers indicate like features and wherein:

FIG. 18A shows a side view of an exemplary embodiment of a food-serving system.

FIG. 18B shows a side view of an exemplary embodiment of a food-serving system.

FIG. 19A shows a side view of an exemplary embodiment of a food-serving system.

FIG. 19B shows a top view of an exemplary embodiment of a food-serving system.

FIG. 19C shows a perspective view of an exemplary embodiment of a food-serving system.

FIG. 20A shows a top view of an exemplary embodiment of a food-serving system.

FIG. 20B shows a side view of an exemplary embodiment of a food-serving system.

FIG. 20C shows a perspective view of an exemplary embodiment of a food-serving system.

FIG. 21A shows a perspective view of an exemplary embodiment of a food-serving system.

FIG. 21B shows a perspective view of an exemplary embodiment of a food-serving system.

FIG. 21C shows a side view of an exemplary embodiment of a food-serving system.

FIG. 21D shows a top view of an exemplary embodiment of a food-serving system.

DETAILED DESCRIPTION

In the following description of the various embodiments, reference is made to the accompanying drawings which form a part hereof, and in which is shown by way of illustration various embodiments in which the subject matter of the disclosure may be practiced. It is to be understood that other embodiments may be utilized and structural and functional modifications may be made without departing from the scope of the present disclosure.

Figure 1:
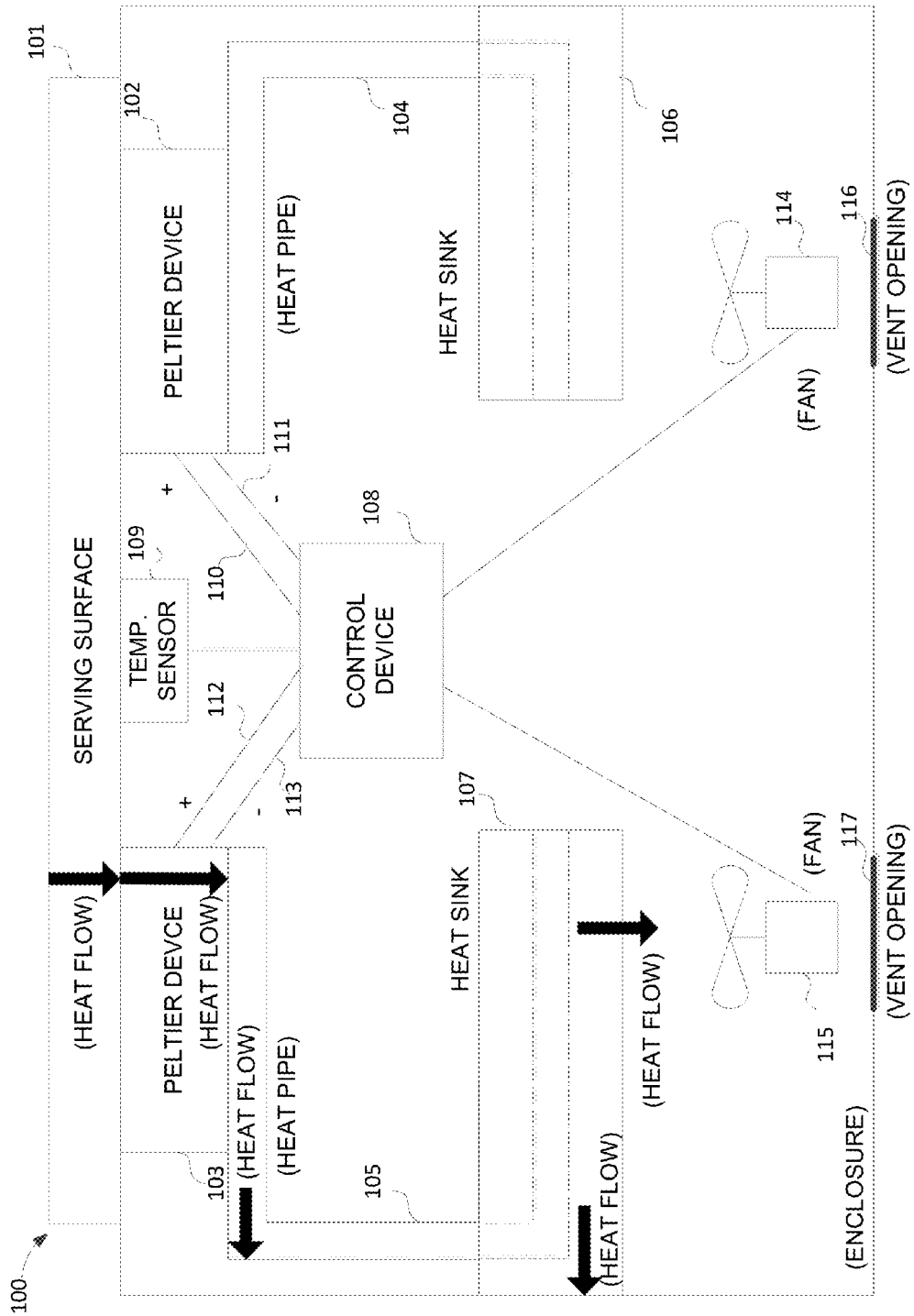
FIG. 1 shows a block diagram of a serving apparatus operating in a cooling mode in accordance with an embodiment of the disclosure.

FIG. 1 shows a block diagram 100 of a serving apparatus operating in a cooling mode in accordance with an embodiment of the disclosure. Block diagram 100 shows the basic elements of the serving apparatus but may not explicitly show the dimensions and relative placement of the elements. For example, heat pipes 105 and 104 may be bent in a horizontal plane rather than a vertical plane so that the operation of the heat pipes is not adversely affected (e.g., by gravity).

The measured temperature of serving surface 101 is changed by transferring heat from Peltier devices 102 and 103 through heat pipes 104 and 105 and through heat sinks 106 and 107, respectively.

Control device 108 activates and deactivates Peltier devices 102 and 103 based on an indication from temperature sensor 109 that is indicative of the measured temperature of serving surface 101. Temperature sensor 109 is typically placed against serving surface 101 in order to provide thermal coupling. For example, when the measured temperature is above a cooling temperature setting (i.e., the desired temperature) control device 108 provides electrical power to Peltier devices 102 and 103 through electrical connections 110 and 111 and connections 112 and 113, respectively.

With some embodiments, heat transfer may be enhanced by fans 114 and 115 producing air circulation from heat sinks 106 and 107, respectively, and through vent openings 116 and 117, respectively.

Figure 2:
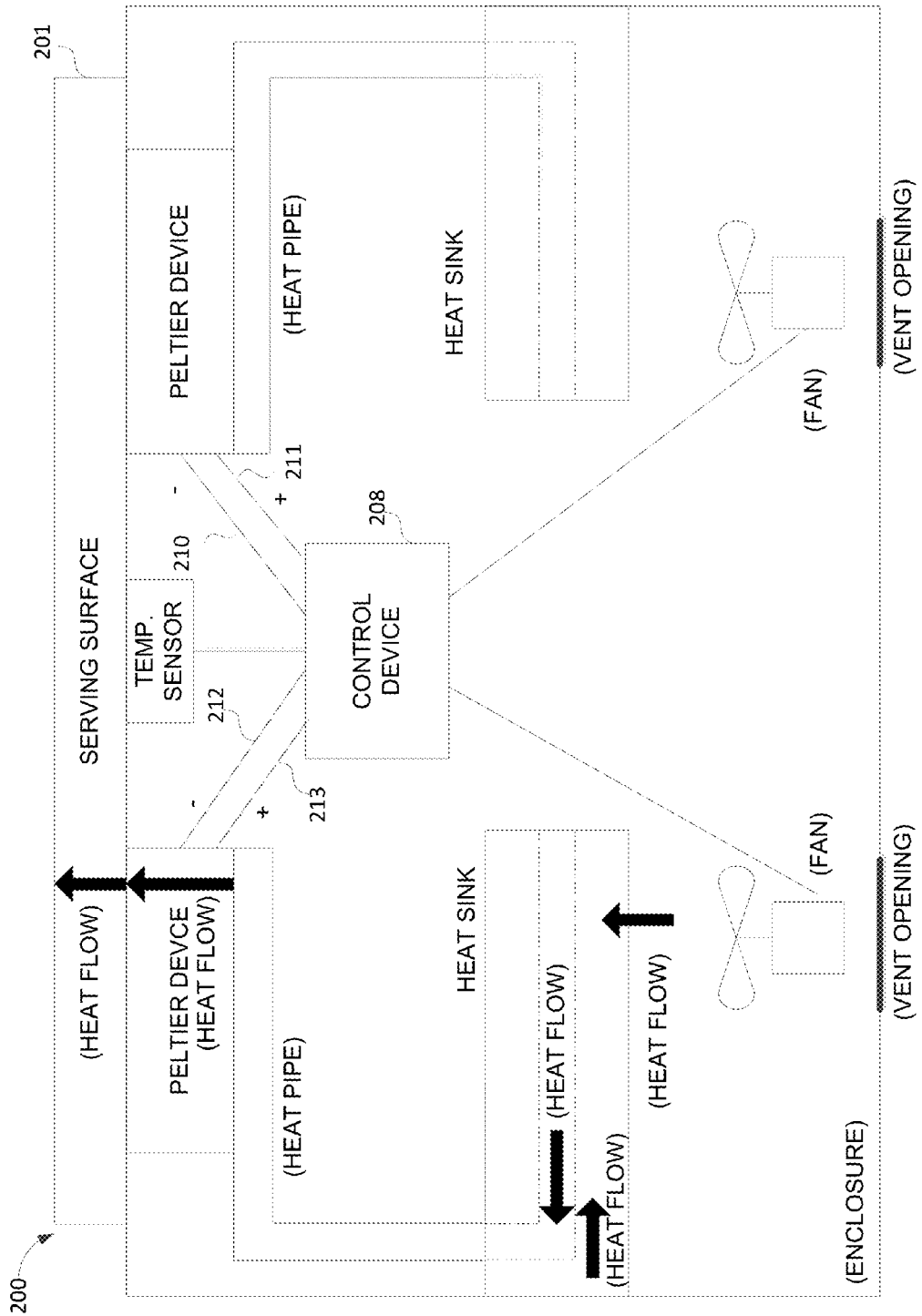
FIG. 2 shows a block diagram of a serving apparatus operating in a heating mode in accordance with an embodiment of the disclosure.

FIG. 2 shows a block diagram 200 of a serving apparatus operating in a heating mode in accordance with an embodiment of the disclosure. With some embodiments, the serving apparatus may be the same serving apparatus as with block diagram 100.

Control device 208 reverses the transfer of heat with respect to block diagram 100 by reversing the electrical polarity of electrical connections 210 and 211 and connections 212 and 213. (As will be discussed, the Peltier effect is a reversible process.) Consequently, heat flows to serving surface 201 to heat it.

Figure 3:
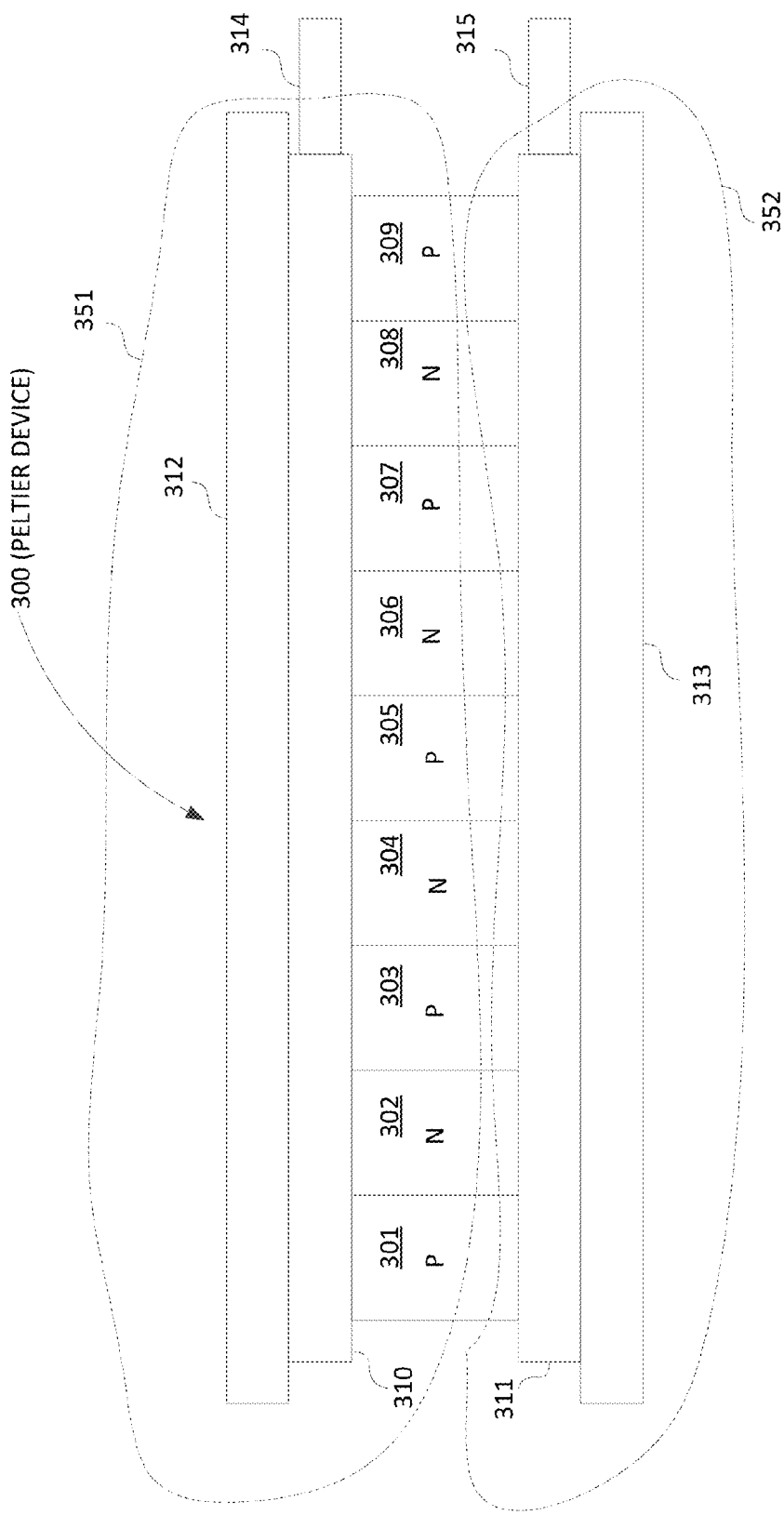
FIG. 3 shows a Peltier device in accordance with an embodiment of the disclosure.

FIG. 3 shows Peltier device 300 in accordance with an embodiment of the disclosure. However, some embodiments may use other types of semiconductor devices that provide similar heating and/or cooling characteristics. Heat is transferred between top side 351 and bottom side 352 based on the Peltier effect. Thermoelectric cooling by Peltier device 300 uses the Peltier effect to create a heat flux between the junctions of two different types of materials. Peltier device 300 may be classified as a heat pump. When direct current is provided to Peltier device 300, heat is moved from one side to the other. Peltier device 300 may be used either for heating or for cooling since the Peltier effect is reversible. For example, heat may be transferred from top side 351 to bottom side 352 to cool a serving surface by providing electrical power at terminals 314 and 315. Moreover, the direction of the heat transfer may be reversed (i.e., from bottom side 352 to top side 351) in order to heat the serving surface by reversing the polarity of the electrical power at terminals 314 and 315.

Peltier device 300 comprises a plurality of N type and P type semiconductor grains 301-309 that are electrically interconnected through electrical conductor arrangements 310 and 311. Ceramic layers 312 and 313 provide thermal conductivity as well as electrical isolation so that Peltier device 300 is able to cool or heat a serving surface. With some embodiments, the serving surface and heat pipe are thermally coupled to ceramic layers 312 and 313, respectively.

With some embodiments, one or more Peltier devices may be used to exchange heat with the serving surface. For example, with the embodiment shown in FIG. 5, four Peltier devices may provide faster cooling than with one Peltier device. Additional Peltier devices may be used; however, electrical power and physical constraints may be factors that limit the number of Peltier devices.

Figure 4:
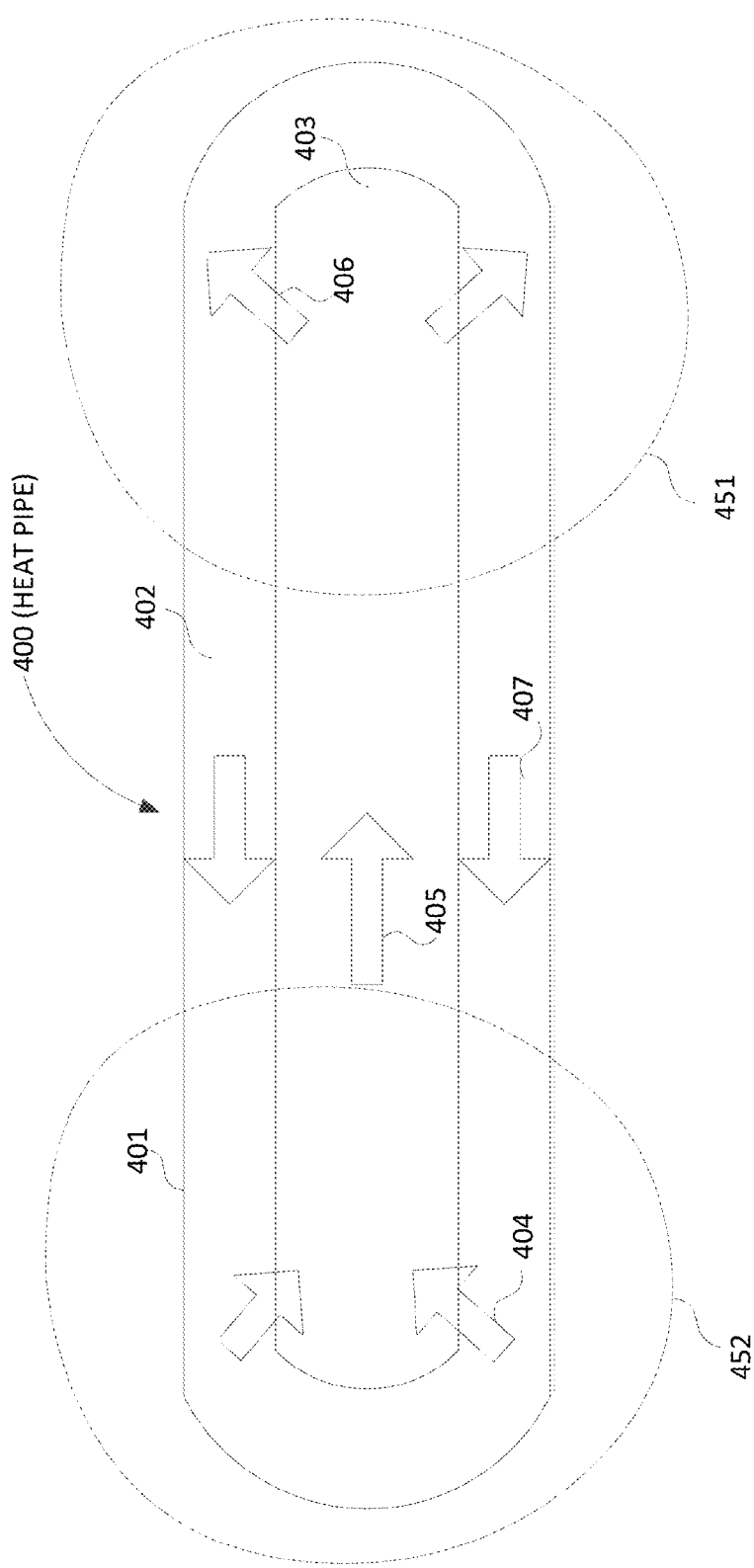
FIG. 4 shows a heat pipe in accordance with an embodiment of the disclosure.

FIG. 4 shows heat pipe 400 in accordance with an embodiment of the disclosure. With some embodiments, heat pipe 400 is a heat-transfer device that combines the principles of both thermal conductivity and phase transition to efficiently manage the transfer of heat between two solid interfaces. At the hot interface within heat pipe 400, which is typically at a very low pressure, a liquid (fluid) is in contact with a thermally conductive solid surface that turns into a vapor by absorbing heat from the surface. The vapor condenses back into a liquid at the cold interface, releasing the latent heat. The liquid then returns to the hot interface through either capillary action or gravity action, where it evaporates once more and repeats the cycle. In addition, the internal pressure of the heat pipe may be set or adjusted to facilitate the phase change depending on the demands of the working conditions of the thermally managed system. With some embodiments, heat pipe 400 does not contain mechanical moving parts and typically requires little or no maintenance.

Heat pipe 400 may be a heat-transfer device that combines the principles of both thermal conductivity and phase transition to efficiently manage the transfer of heat between two ends. With traditional systems, a radiator using single-phase convection with a high-speed motor often provides heat transfer. However, heat pipe 400 can transfer the heat efficiently without a high-speed motor.

Heat pipe 400 transports heat from portion 452 to portion 451. Heat pipe 400 comprises casing 401, wick 402, and vapor cavity 403. Casing 401 may comprise a sealed pipe or tube made of a material with high thermal conductivity such as copper or aluminum at both hot and cold ends. Working fluid evaporates to vapor absorbing thermal energy at event 404. Examples of such fluids include water, ethanol, acetone, sodium, or mercury. The vapor migrates along cavity 403 from portion 452 (high temperature end) to portion 451 (low temperature end). The vapor condenses back to fluid and is absorbed by wick 402 at event 406, and the fluid flows back to portion 402 through wick 402.

Figure 5:
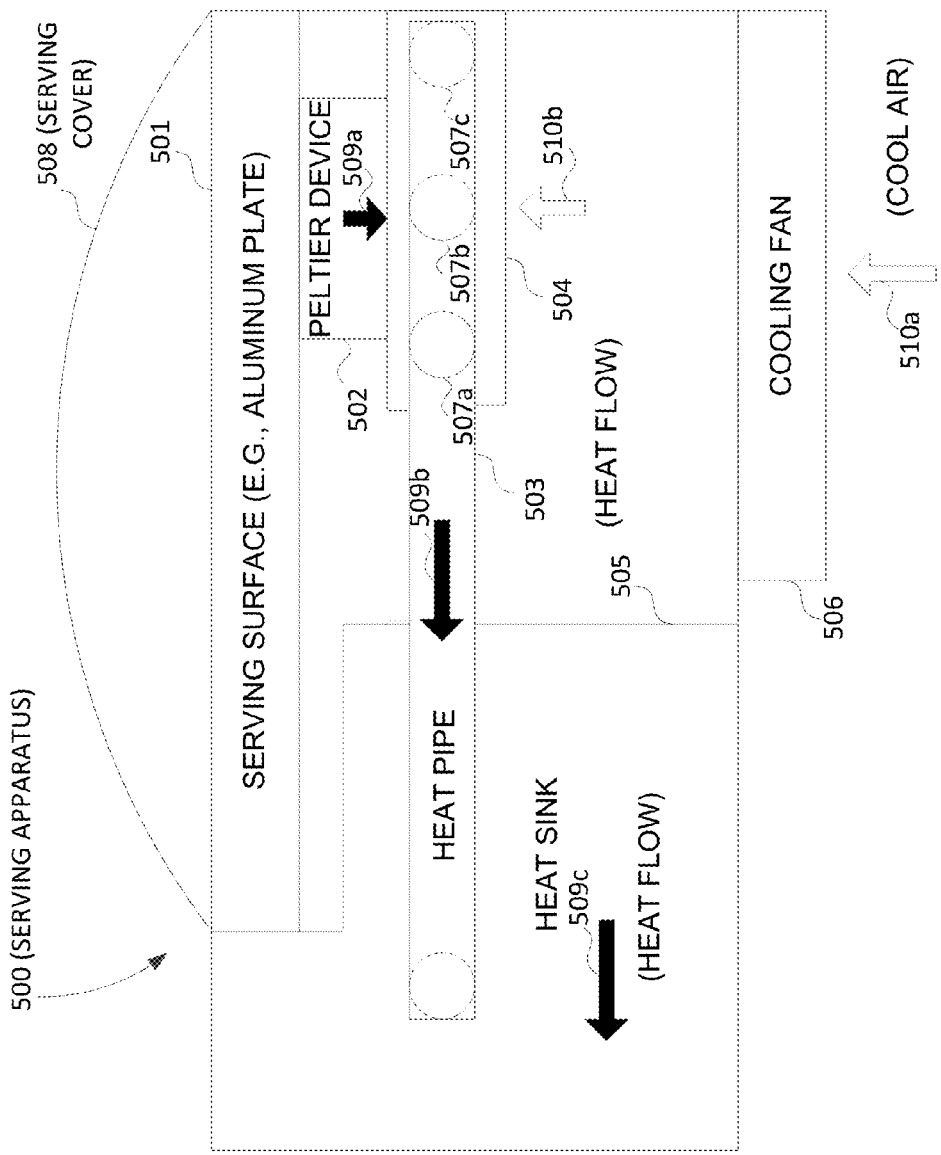
FIG. 5 shows a serving apparatus in accordance with an embodiment of the disclosure.

With some embodiments, referring to FIG. 5, heat pipe 503 comprises a sealed pipe or tube made of a material with high thermal conductivity, i.e., copper at both hot and cold ends. For example, a copper pipe or tube may be approximately 300 MM long with a diameter of approximately 8 mm. Heat pipe 503 is typically constructed with a tube shell, wick and end caps. Heat pipe 503 may be drawn into negative pressure and may be filled with the fluid such as pure water. Wick 402 is typically constructed with a capillary porous material. Evaporation of the fluid occurs at one end of heat pipe 503, while condensation occurs at the other end. When the evaporation end is heated, the capillary action in the fluid evaporates quickly. With a small gravity difference between two ends, the vapor flows to the other end, releasing heat. The vapor is then re-condensed into fluid, which runs along the porous material by capillary forces back into the evaporation end. This cycle is repeated to transfer the heat from the one end to the other end of heat pipe 503. This cycle is typically fast, and the heat conduction is continuous. Good performance of the wick is often characterized by:

1. Large capillary action or small effective aperture of wick,
2. Smaller fluid flow resistance, which have higher permeability,
3. Good thermal conductivity characteristics, and
4. Good repeatability and reliability in the manufacturing process.

Referring to FIG. 4, heat pipe 400 may have bends in order to route the heat transfer to or from a heat exchange device providing that the bends to not adversely affect the capillary or gravity action of heat pipe 400. For example, referring to FIG. 5, heat pipe 503 is bent in a horizontal plane to route the heat between Peltier device 502 and heat sink 505.

FIG. 5 shows serving apparatus 500 in accordance with an embodiment of the disclosure. While serving apparatus 500 is depicted in the cooling mode, apparatus 500 may be used to heat aluminum plate 501 (which functions as the serving surface on which an item is placed) based on the previous discussion.

Peltier device 502 is thermally coupled to serving surface 501 and copper block 504, where the top side (corresponding to ceramic layer 312 as shown in FIG. 3) is physically situated against serving surface 501 and the bottom side (corresponding to ceramic layer 313) is physically situated against copper block 504. Thermal conductivity may be enhanced by ensuring the flatness of the installation surface, and coating the contact surface with a thin layer of heat conduction silicon grease. Also, in order to avoid fracturing the ceramic layers of Peltier device 502, the pressure against the layers should be even and not excessive when fixing device 502.

Heat pipe 503 is thermally coupled to Peltier device 502 through copper block 504 so that heat flows along heat flow 509a and 509b. However, with some embodiments, heat pipe 503 may be directly placed against Peltier device 502. Heat pipe 502 transports heat along heat flow 509b by traversing through copper block 504 via branches 507a-507c and heat sink 505. Heat is thus transported along heat flow 509c and into the surrounding environment of serving apparatus 500.

With some embodiments, heat sink 505 may be constructed from copper and/or aluminum in order to achieve performance, size, and cost objectives.

With some embodiments, fan 506 operates when apparatus is operating in the cooling mode. However, with some embodiments, fan 506 may operate in the heating and/or cooling modes. Fan 506 assists in the transfer of heat by drawing in cool air 510a and 510b so that heat sink 505 may be kept to a smaller size than without fan 506. With some embodiments, the speed of fan 506 may be changed based on the temperature of serving surface 501. For example, the speed may be increased when the difference of measured temperature of serving surface 501 and the desired temperature increases. However, with some embodiments, the speed of fan 506 may be fixed when fan 506 is activated and may operate during the entire duration of operation.

With some embodiments, while not explicitly shown in FIG. 5, a cooling fan may circulate air to provide inner air convection within the serving chamber (within serving cover 508 and serving plate 501) to enhance the cooling of food within the chamber. With some embodiments, a fan may support inner air convection when the apparatus is operating in the heating mode.

Figure 6:
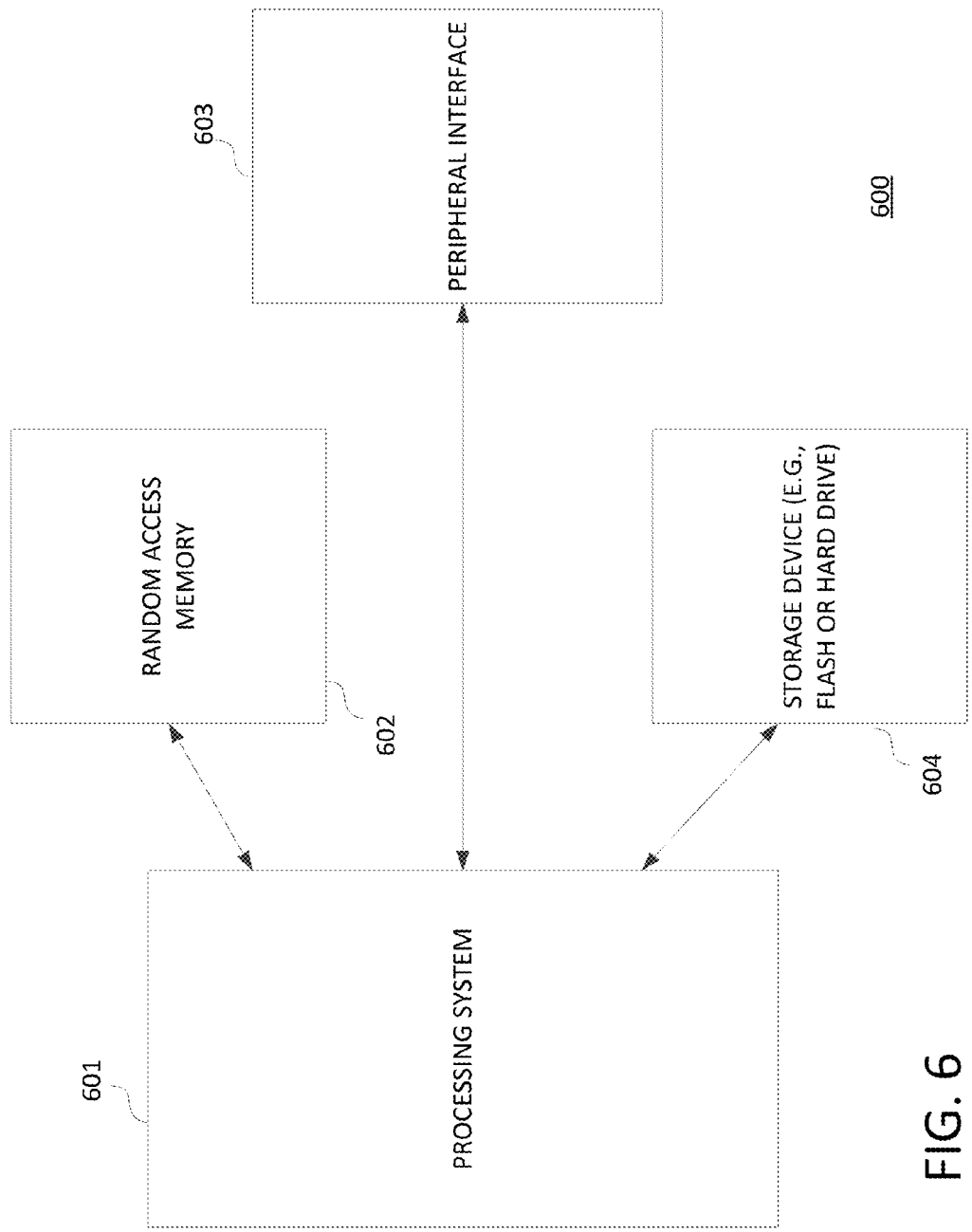
FIG. 6 shows a control device in accordance with an embodiment of the disclosure.

FIG. 6 shows control device 600 for controlling apparatus 100 (corresponding to control device 108 as shown in FIG. 1), apparatus 200 (corresponding to control device 208 as shown in FIG. 2), and apparatus 500 (as shown in FIG. 5) in accordance with an embodiment of the disclosure. Processing system 601 may execute computer executable instructions from a computer-readable medium (e.g., storage device 604) in order provide verify communication redundancy for a network, Memory 602 is typically used for temporary storage while storage device 504 may comprise a flash memory and/or hard drive for storing computer executable instructions and a profile image. However, computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing system 601. The executable instructions may carry out any or all of the method steps described herein.

With some embodiments, processing system 601 may correspond to one or more processors and storage device 604 may correspond to one or more memories.

Control device 600 may be implemented as one or more ASICs or other integrated circuits (e.g., a single chip computer) having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 8:
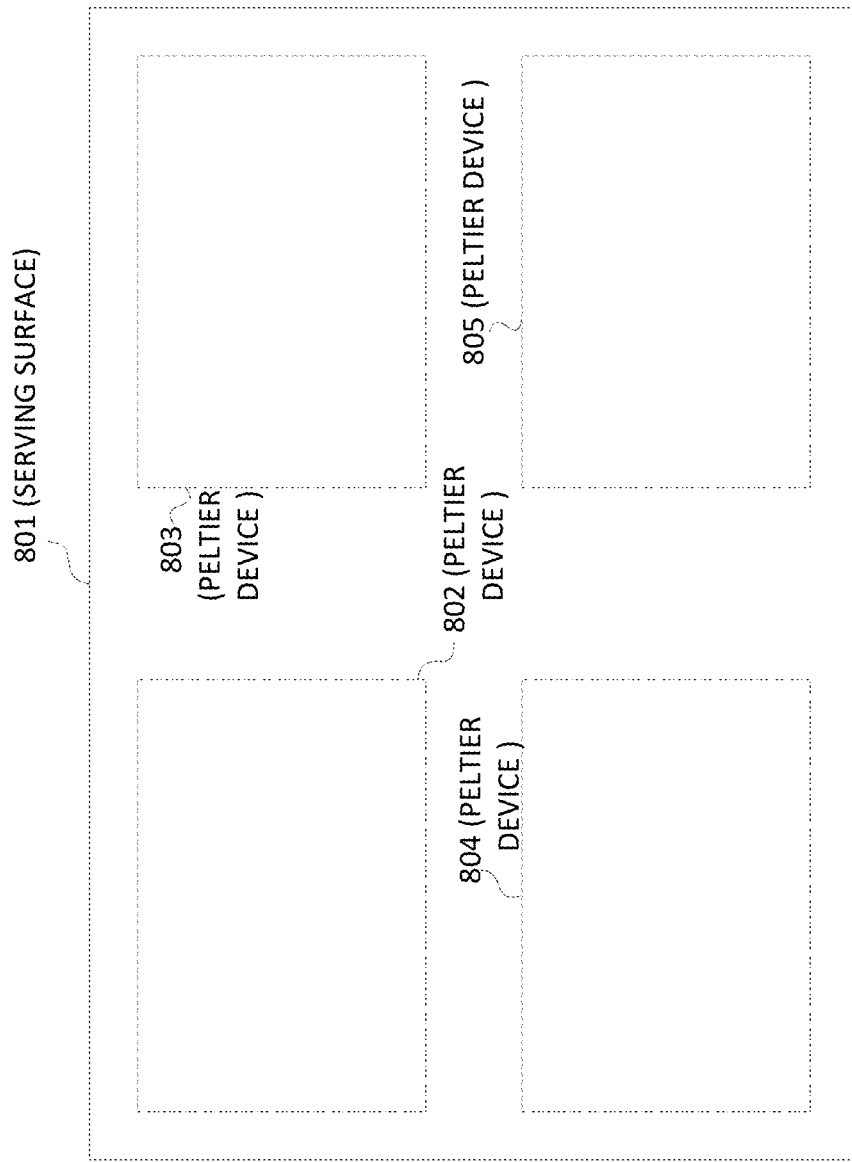
FIG. 8 shows an arrangement of Peltier devices for changing a serving surface temperature in accordance with an embodiment of the disclosure.

With some embodiments, control device 600 supports different control capabilities for heating and/or cooling. For example, device 600 may obtain a temperature setting (desired temperature) from a user through an input device and control one or more Peltier devices (e.g., Peltier devices 802-805 as shown in FIG. 8) to compensate for environmental factors in order to approximate the desired temperature. Control device 600 may also sense when cover 508 (as shown in FIG. 5) is open (e.g. through a switch not explicitly shown), and control the Peltier devices accordingly. For example, control device 600 may activate the Peltier devices for a longer period of time when cover 508 is open than when it is shut.

Figure 7:
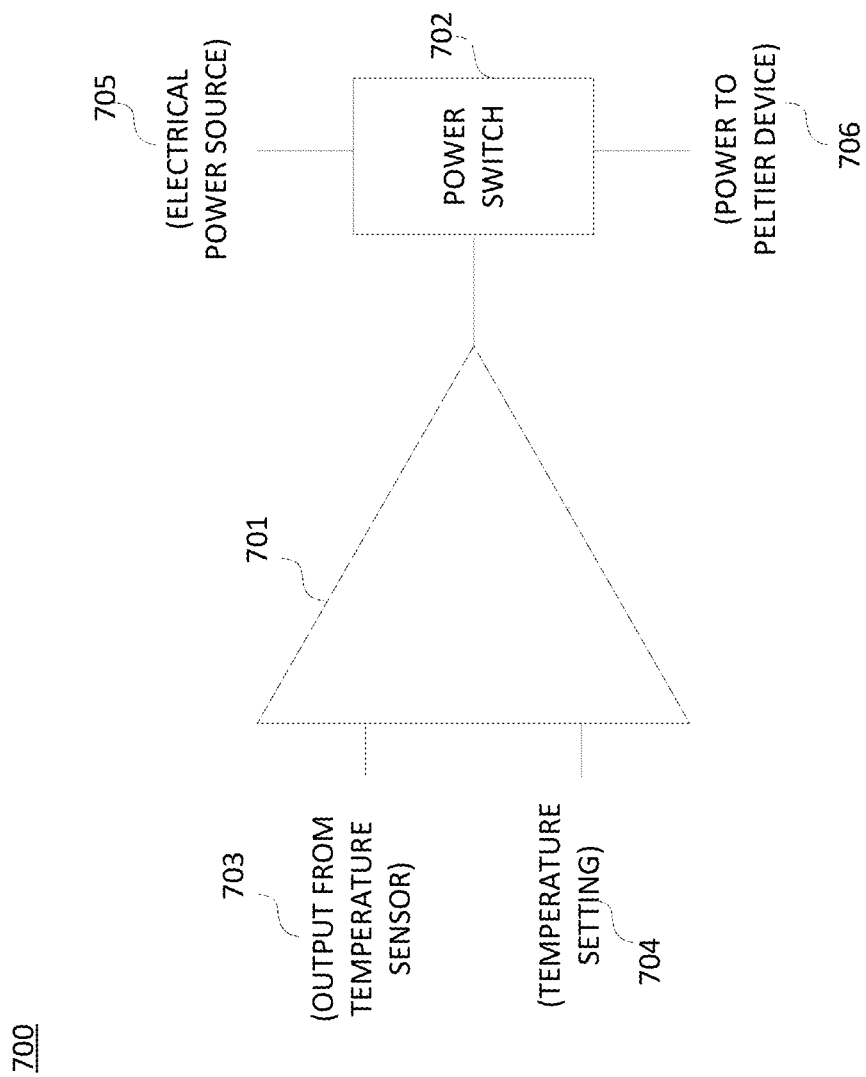
FIG. 7 shows circuitry for controlling Peltier devices in accordance with an embodiment of the disclosure.

FIG. 7 shows circuitry 700 for controlling Peltier devices in accordance with an embodiment of the disclosure. While some of the functionality of a serving apparatus may be implemented with a control device (e.g., control device 600 as shown in FIG. 6), some or all of the functionalities may be implemented with separate circuitry, e.g., circuitry 700. For example, circuitry 700 controls the activation of the Peltier devices by a comparator 701 comparing temperature setting 704 and measured temperature 703. Comparator 701 may have hysteresis characteristics so that once Peltier device 706 is activated by providing electrical power from source 705 through power switch 702, activation continues until the serving surface reaches a hysteresis temperature.

Figure 11:
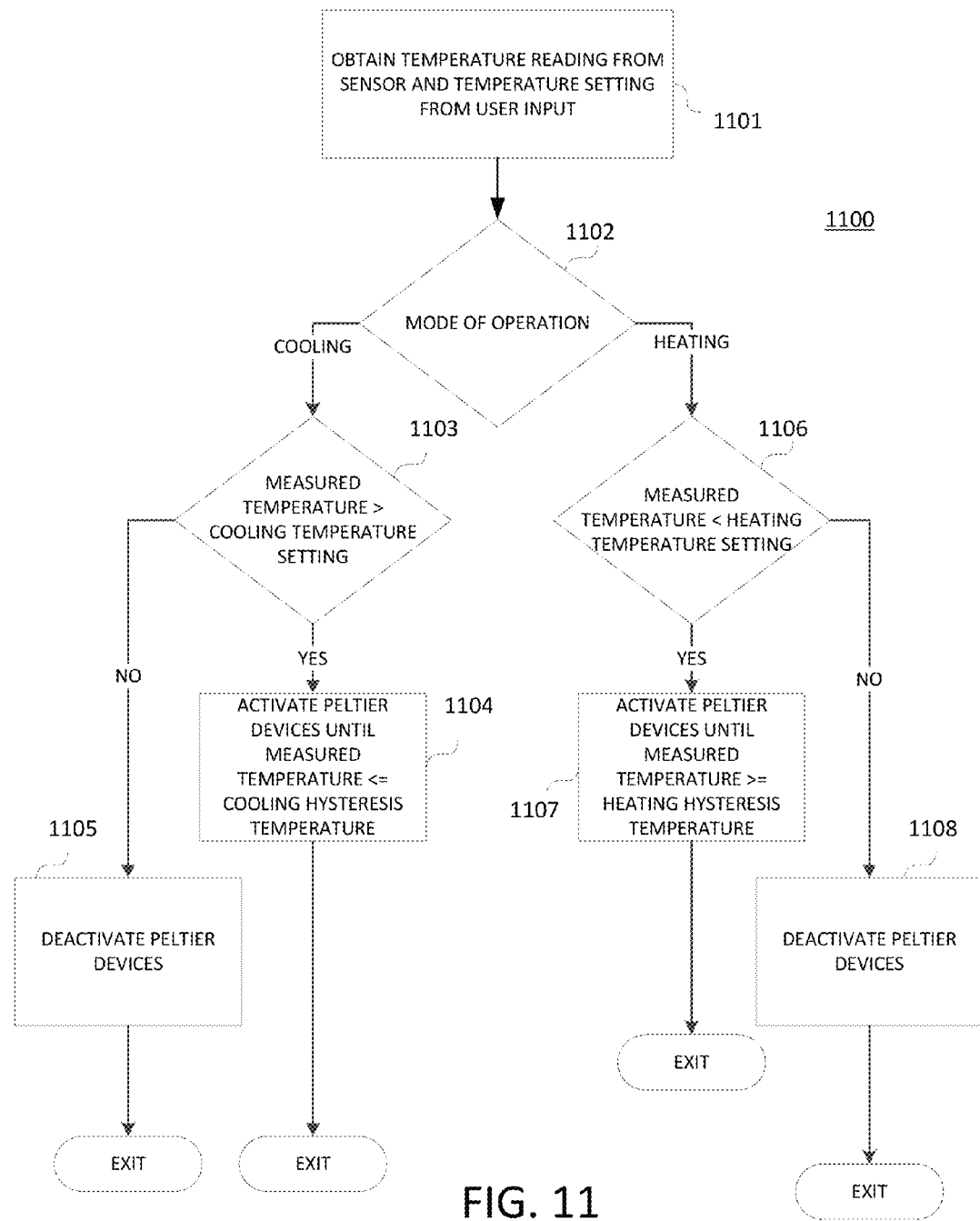
FIG. 11 shows a flowchart for controlling Peltier devices in accordance with an embodiment.

FIG. 8 shows a collection of Peltier devices for changing a serving surface temperature in accordance with an embodiment of the disclosure. Embodiments may support one or more Peltier devices in order to increase or decrease the temperature of a serving surface. With some embodiments, as shown in FIG. 8, four Peltier devices 802-805 may heat or cool serving surface 801. Some or all of the Peltier devices may be activated at one time. For example, when the temperature of serving surface 801 is within a temperature range, Peltier devices 802-805 may be deactivated. When the measured temperature of serving surface 801 is outside the temperature range, all of the Peltier devices 802-805 are activated. (This approach is incorporated in flowchart 1100 as shown in FIG. 11 and will be further discussed.) However, with some embodiments, only a proper subset of Peltier devices (e.g., devices 802 and 805 or devices 803 and 804) is activated at a given time when the temperature is outside the temperature range. Moreover, different subsets may be activated in a sequenced manner in order to provide more consistent thermal properties, such as more even cooling and/or heating, over serving surface 801. For example, a first subset and a second subset may be activated and deactivated, respectively, during a first time duration while reversing activation states during the second time duration.

Figure 9:
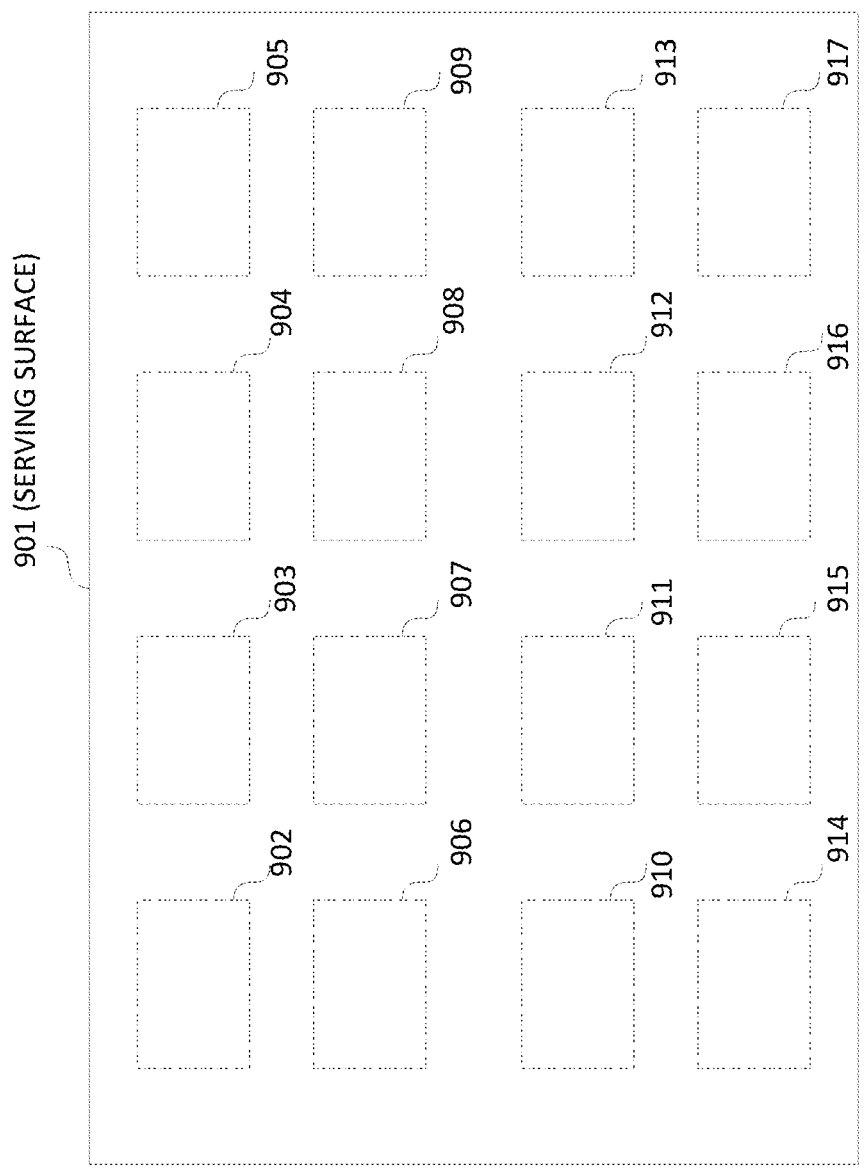
FIG. 9 shows an arrangement of Peltier devices for changing a serving surface in accordance with an embodiment of the disclosure.

Some embodiments may support a greater number of Peltier devices. However, the number of Peltier devices may be limited by physical constraints and/or electrical power limitations. FIG. 9 shows a collection of sixteen Peltier devices 902-917 for changing serving surface 901 in accordance with an embodiment of the disclosure. As discussed previously, some or all of devices 902-917 may be activated at the same time. Devices 902-917 may be partitioned into a plurality subsets, e.g., a first subset including devices 802, 805, 807, 808, 811, 812, 814, and 817, a second subset including 802, 804, 807, 809, 810, 812, 815, and 817, and third subset including devices 803, 805, 806, 808, 811, 813, 814, and 816, where some or all of the subsets may have overlapping members.

With some embodiments, the same Peltier devices may be used for different modes of operation. For example, referring to FIG. 8, Peltier devices 802-805 may be used both for heating and cooling.

With some embodiments, different Peltier devices may be used for different modes of operation. For example, Peltier devices 802 and 805 may be used for cooling while Peltier devices 803 and 804 may be used for heating. As another example, Peltier devices 802-805 may be used for cooling while only Peltier devices 502 and 805 are used for heating.

Figure 10:
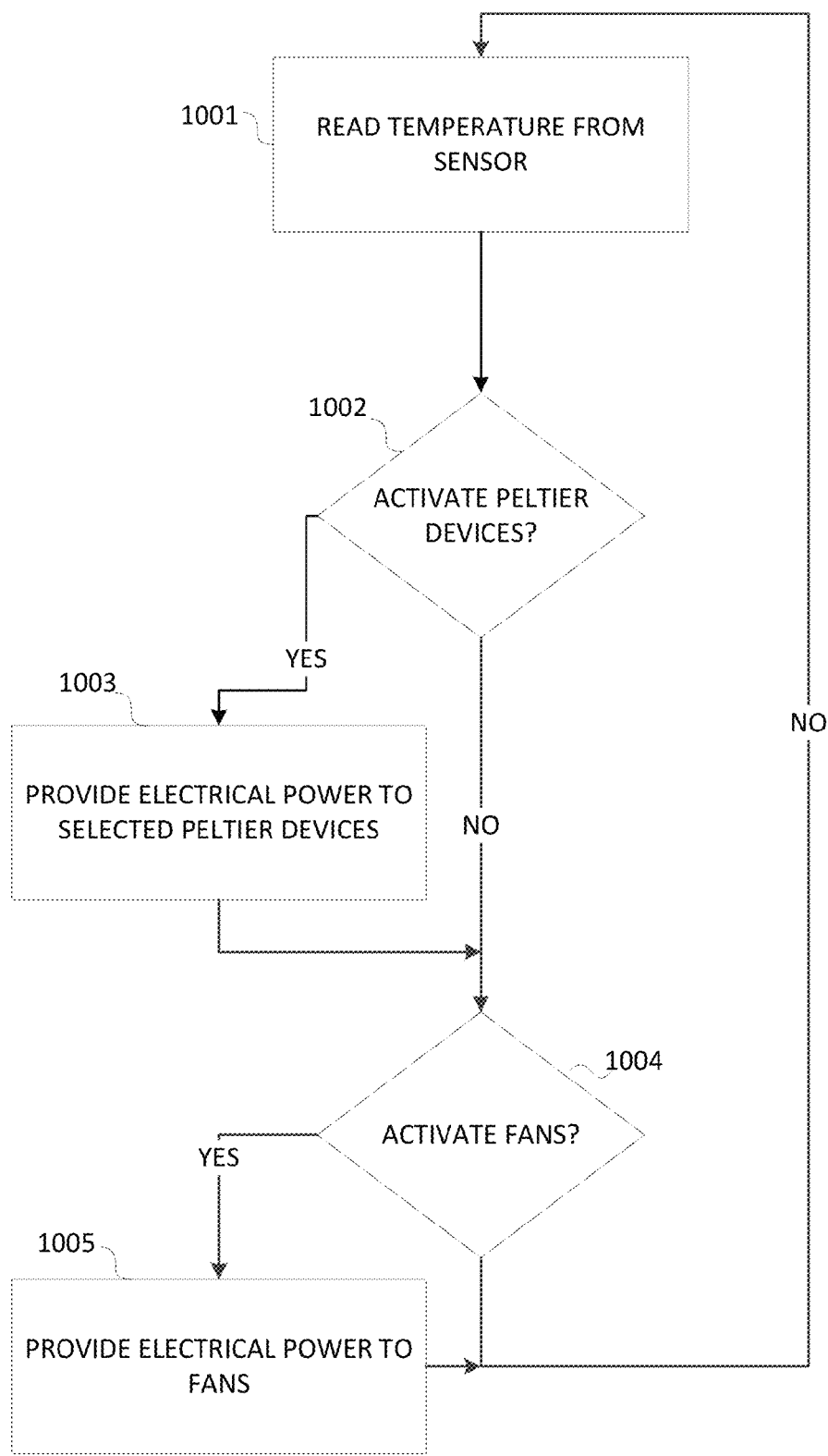
FIG. 10 shows a flowchart for controlling a serving apparatus in accordance with an embodiment.

FIG. 10 shows flowchart 1000 for controlling a serving apparatus in accordance with an embodiment. At block 1001, a control device (e.g., control device 108 as shown in FIG. 1) reads the measured temperature of the serving surface (e.g., surface 101) from the temperature sensor (e.g., sensor 109). At block 1002, the control device determines whether to activate some or all of the Peltier devices at block 1003. With some embodiments, selected Peltier devices (i.e., all or some of the Peltier devices) may be activated until the measured temperature reaches a hysteresis temperature so that a hysteresis characteristic is incorporated. For example, the temperature setting may be 35° F. when the serving apparatus is operating in the cooling mode. In such a case, the selected Peltier devices may be activated until the serving surface is cooled down sufficiently so that the measured temperature reaches 33° F. (the hysteresis temperature). The hysteresis temperature is typically offset from the temperature setting by several degrees so that control cycling is reduced. Different exemplary procedures for controlling the Peltier devices will be discussed in FIGS. 11 and 12.

At block 1004, the control device determines whether to activate one or more fans (e.g., fans 114 and 115). For example, with some embodiments the fans may be activated at block 1005 only when the measured temperature is outside a temperature range to assist transferring heat with the environment of the serving apparatus. However, with some embodiments, a fan may be activated only for specific operating modes, e.g., a cooling mode or a heating mode.

FIG. 11 shows flowchart 1100 for controlling Peltier devices in accordance with an embodiment. At block 1101 a control device obtains a measured temperature of a serving surface from a temperature sensor and the temperature setting (desired temperature) of the serving surface from a user input. At block 1102, the control device determines the mode of operation, i.e., cooling or heating. Based on the mode of operation, the control device determines whether to activate the Peltier devices based on the measured temperature, temperature setting, and hysteresis temperature at blocks 1103-1108.

At block 1103, the control device operates in the cooling mode and determines whether the measured temperature exceeds the cooling temperature setting. If so, the control device activates the Peltier devices until the measured temperature is less than or equal to the cooling hysteresis temperature at block 1104. Otherwise (i.e., the measured temperature does not exceed the cooling temperature setting), the control device deactivates the Peltier devices at block 1105.

At block 1106, the control device operates in the heating mode and determines whether the measured temperature is less than the heating temperature setting. If so, the control device activates the Peltier devices until the measured temperature is greater than or equal to the heating hysteresis temperature at block 1107. Otherwise (i.e., the measured temperature does not exceed the cooling temperature setting), the control device deactivates the Peltier devices at block 1108.

Figure 12:
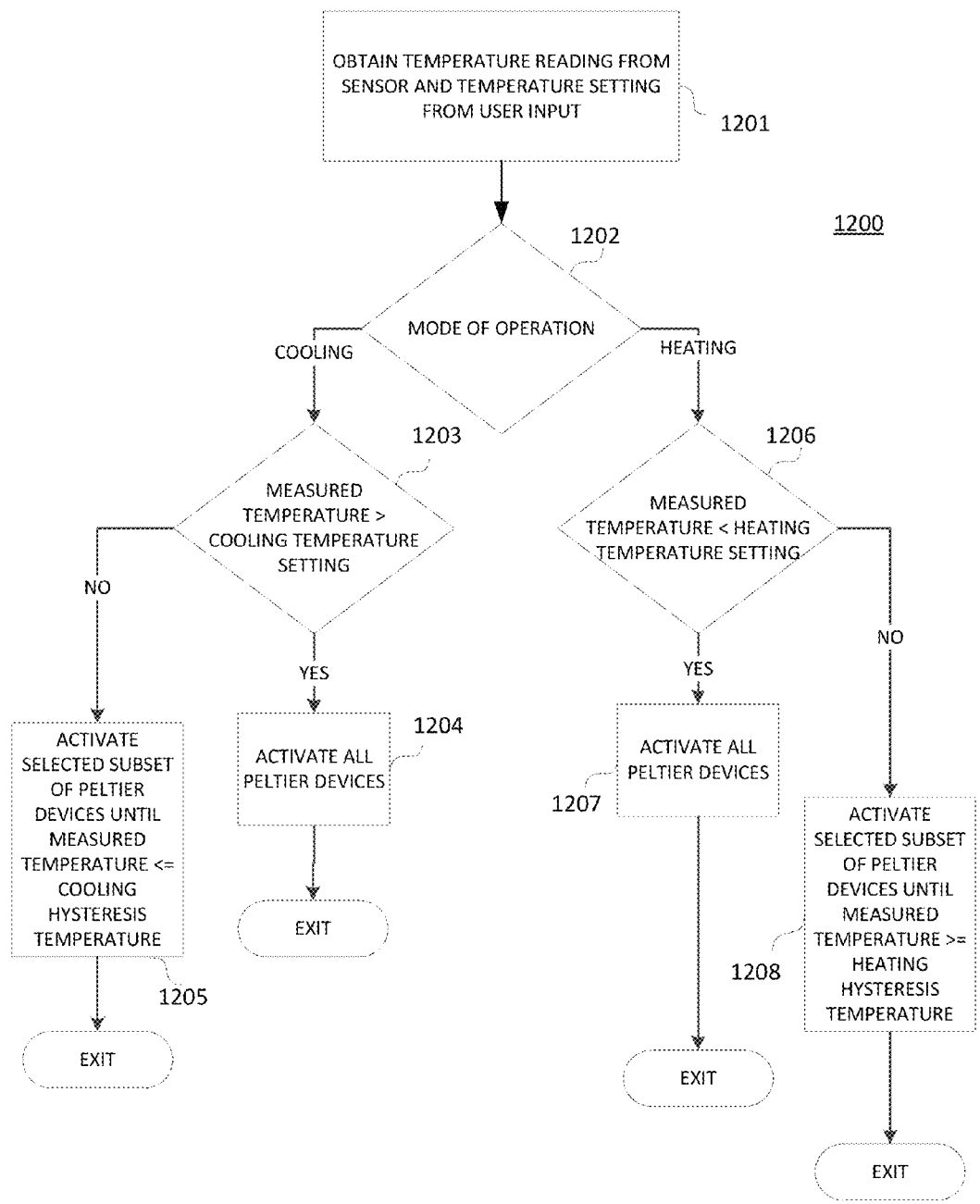
FIG. 12 shows a flowchart for controlling Peltier devices in accordance with an embodiment.

FIG. 12 shows flowchart 1200 for controlling Peltier devices in accordance with an embodiment. Flowchart 1200 is similar to flowchart 1100, where blocks 1201 and 1202 correspond to blocks 1101 and 1102, respectively. However, process 1200 activates all of the Peltier devices when the measured temperature is outside a temperature range (e.g., between the temperature setting and the hysteresis temperature) at blocks 1204 and 1207 and a selected subset of the Peltier devices when the measured temperature is within the temperature range at blocks 1205 and 1208. When operating at blocks 1205 and 1208, the control device may select different subsets from the plurality of Peltier devices and sequence through the different subsets. For example, referring to FIG. 9, the control device may first select and activate the first subset for a first time duration, followed by the second subset, followed by the third subset, followed by the first subset, and so forth.

Figure 13:
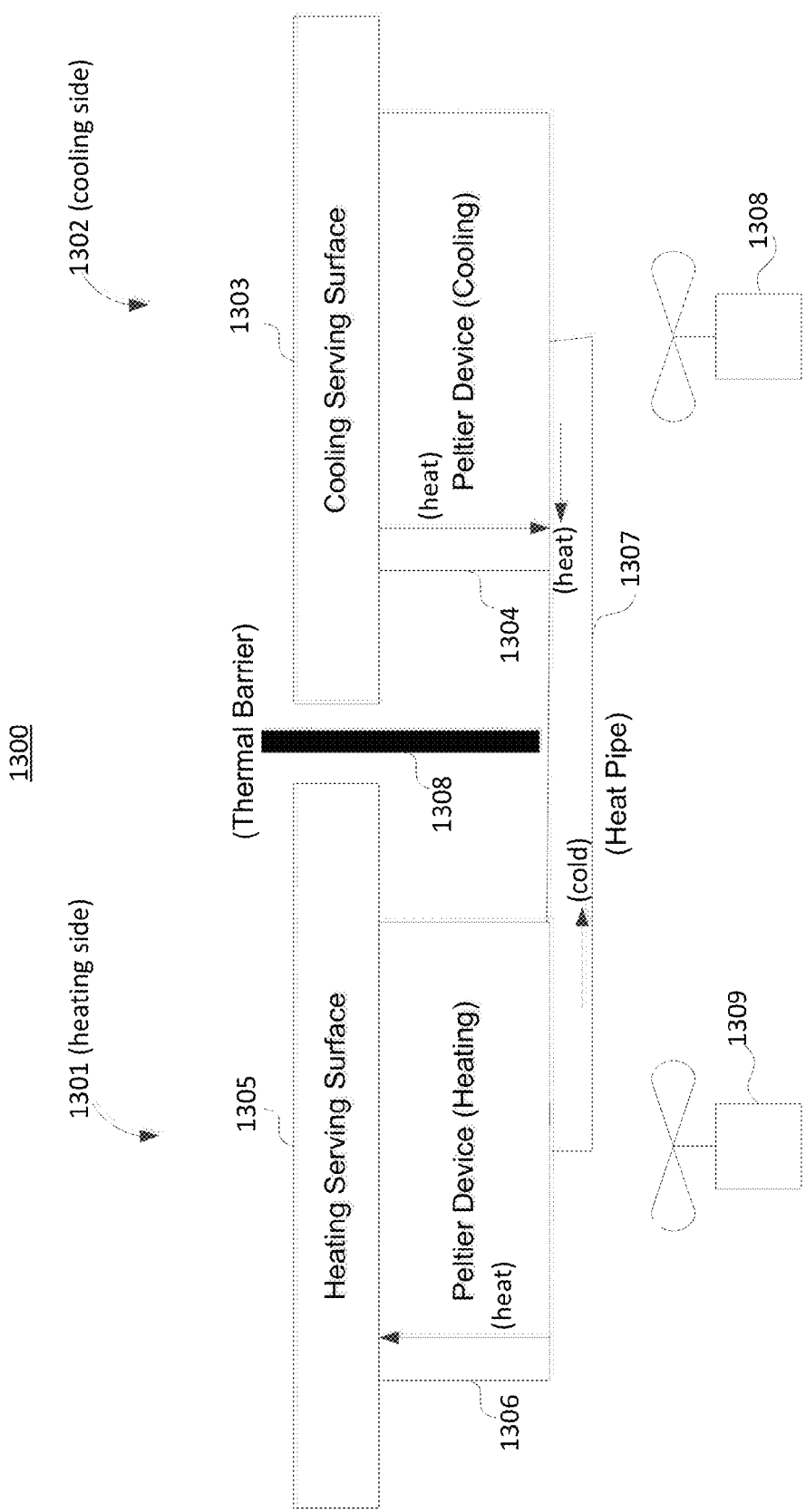
FIG. 13 shows a serving apparatus with a heating side and a cooling side in accordance with an embodiment.

FIG. 13 shows a serving apparatus 1300 with a heating side 1301 and a cooling side 1302 in accordance with an embodiment. Heating side 1301 and cooling side 1302 may operate at the same time so that heating serving surface 1305 may be heating one food item (e.g., hot cereal for breakfast) while cooling serving surface 1303 may be simultaneously cooling another food item (e.g., orange juice for breakfast).

Cooling serving surface 1303 is cooled by Peltier device 1304 transferring heat from its top to bottom, where Peltier device 1304 is thermally coupled to surface 1303. Heating service surface 1305 is thermally coupled to Peltier device 1306, which transfers heat from its bottom to its top. Consequently, waste heat is generated at the bottom of Peltier device 1304 while waste cold (loss of heat) is generated at the bottom of Peltier device 1306.

With some embodiments, Peltier device 1304 and/or Peltier device 1306 may comprise a plurality of plurality of Peltier devices similarly shown in FIGS. 8 and 9.

A first portion of heat pipe 1307 is thermally coupled to Peltier device 1304 while a second portion of heat pipe 1307 is thermally coupled to Peltier device 1306, in which the operation of heat pipe 1307 is similar to the operation of heat pipe 400 as shown in FIG. 4. Consequently, waste heat is transferred from Peltier device 1304 to Peltier device 1306, which absorbs some of the waste heat. On the other hand, waste cold is transferred from Peltier device 1306 to Peltier device 1304, which utilizes the cold in order to lower its operating temperature. As a result, waste heat and waste cold may be used by Peltier devices 1304 and 1306 that would have otherwise been expended into the surrounding environment.

Heat pipe 1307 may be directly coupled to Peltier device 1304 and/or Peltier device 1306. However, heat pipe 1307 may be thermally coupled to ambient air adjacent to the bottom of Peltier device 1304 and/or Peltier device 1306. With some embodiments, heat pipe 1307 may be thermally coupled to Peltier device 1304 and/or Peltier device 1306 through another material (e.g., similar to copper block 504 as shown in FIG. 5).

With some embodiments, heat pipe 1307 may be directly routed between Peltier devices 1304 and 1306, where heat pipe 1307 provides a continuous connection between the hot side and the cold side of Peltier devices 1304 and 1306, respectively. Consequently, separate heat sinks (heat exchange device) and fans (e.g., as shown in FIGS. 1, 2, and 5) may not be required because the opposite Peltier device may function as the heat sink for the other Peltier device. For example, the phase change (liquid to gas and/or gas to liquid) of heat pipe 1307 may cause heat/cold flow from one Peltier device to the other so that separate heat sinks and/or fans may not be needed to cause the temperature change to influence the heat/cold flow.

With some embodiments, heat pipe 1307 may be routed through a heat exchange device to assist in expending waste heat and/or waste cold. Heat pipe 1307 may have bends (not explicitly shown in FIG. 13) in order to route the heat transfer to or from a heat exchange device providing that the bends to not adversely affect the capillary or gravity action of heat pipe 1307. One or more fans 1308 and 1309 and/or heat exchange devices (not explicitly shown in FIG. 13) may be positioned in the vicinity of heat pipe 1307 to assist in the exchange of waste heat and/cold.

Thermal barrier 1308 provides thermal separation (isolation) between heating side 1301 and cooling side 1302 so that heating serving surface 1305 and cooling serving surface 1303 do not adversely affect each other.

Figure 14:
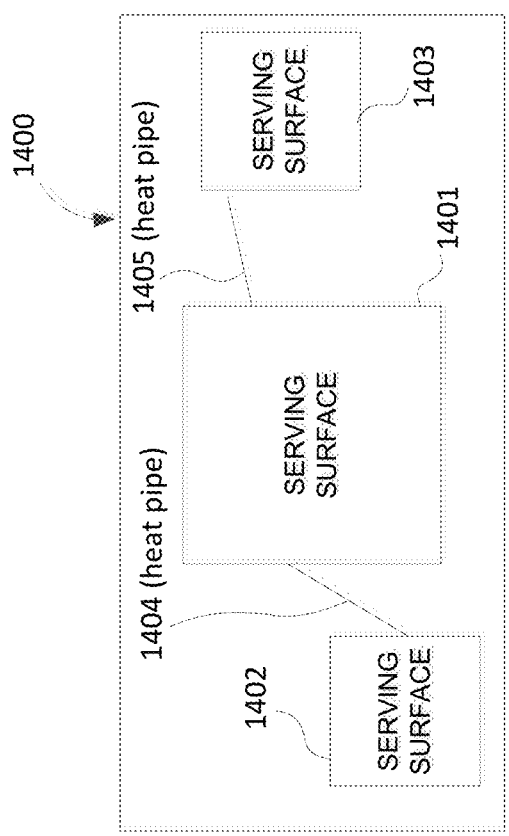
FIG. 14 shows a serving apparatus with serving surfaces in accordance with an embodiment.

While serving apparatus 1300 may support one heating surface (surface 1305) and one cooling surface (surface 1303), a serving apparatus may support more than two serving surfaces with some of the embodiments. For example, FIG. 14 shows a top view of apparatus 1400 that has heating surface 1401 (that may be used for the main course) and two cooling surfaces 1402 and 1403 (that may be used for a salad and cold desert, respectively). The surface areas and the temperature changes may be different for the different serving surfaces. For example, apparatus 1400 may have a plurality of cooling zones, where cooling surface 1402 chills a salad while cooling surface 1403 keeps ice cream from melting. Moreover, while serving surfaces 1401-1403 are depicted as rectangularly shaped, some embodiments may have differently shaped serving surfaces. Also, with some embodiments, surfaces 1401-1403 may have flat or concave surfaces in order to better contain the served item.

With some embodiments, heat pipes 1404 and 1405 may be routed between serving surfaces 1401, 1402, and 1403 to assist in expending waste heat and/or waste cold. Different heat pipe configurations may be supported such as routing a heat pipe between a pair of serving surfaces (e.g., between serving surfaces 1401 and 1402) or routing a heat pipe across more than two serving surfaces (e.g., 1401, 1402, and 1403).

Figure 15:
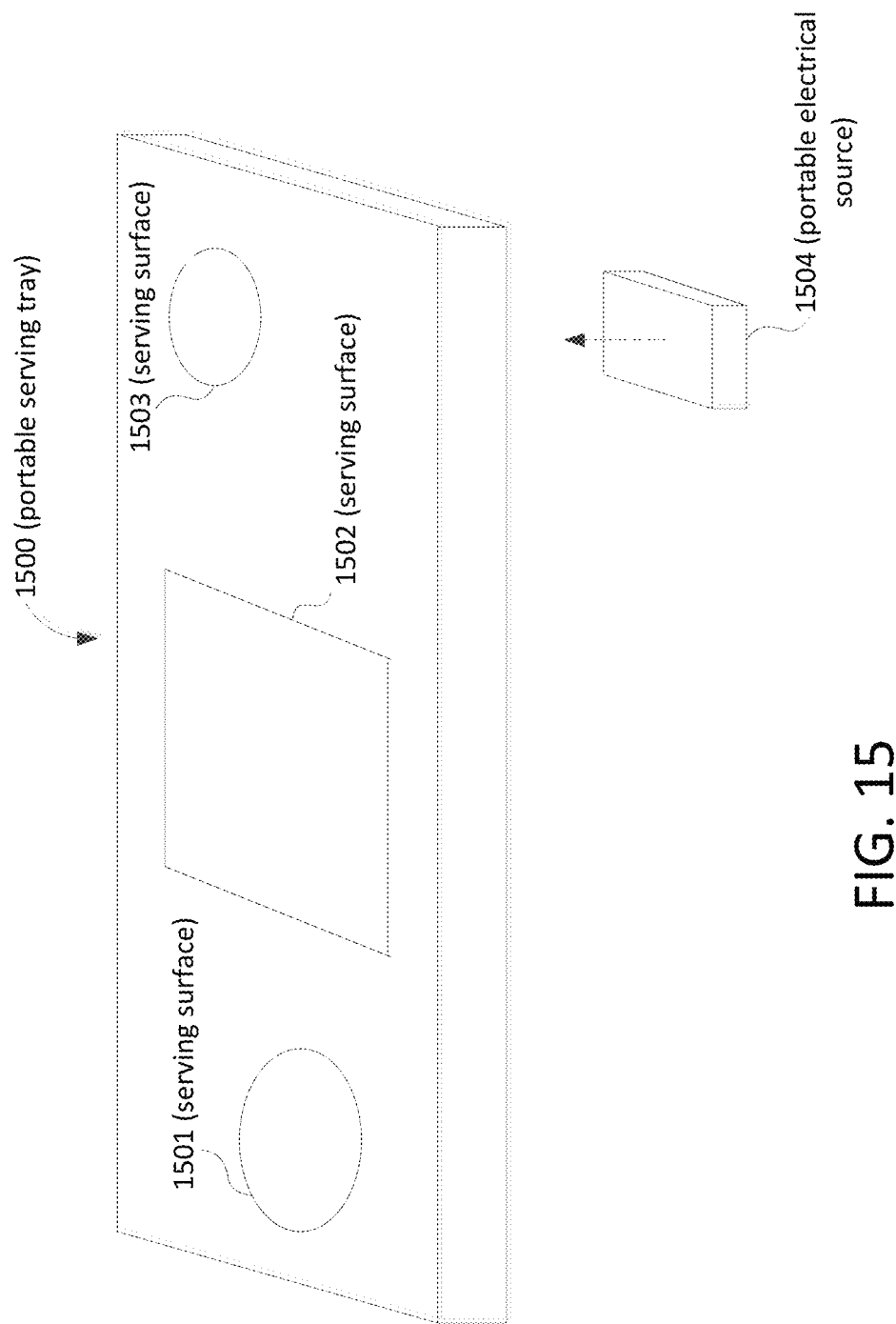
FIG. 15 shows a portable serving tray in accordance with an embodiment.

FIG. 15 shows portable serving tray 1500 that supports serving surfaces 1501-1503 that may be used to heat or cool different items in accordance with an embodiment. Portable serving tray 1500 contains at least one Peltier device (not explicitly shown in FIG. 15) to provide desirable temperature changes for serving surfaces 1501-1503. In order to have portable operating characteristics, portable serving tray 1500 may be powered by portable electrical source 1504 that may be inserted into tray 1500. With some embodiments, portable electrical source 1504 may include a battery and/or fuel cell.

Portable serving tray 1500 may be used in different serving environments, including a hospital, hotel, or restaurant. Also, different types of items may be heated or cooled, including food, liquids, and non-eatable items.

Figure 16:
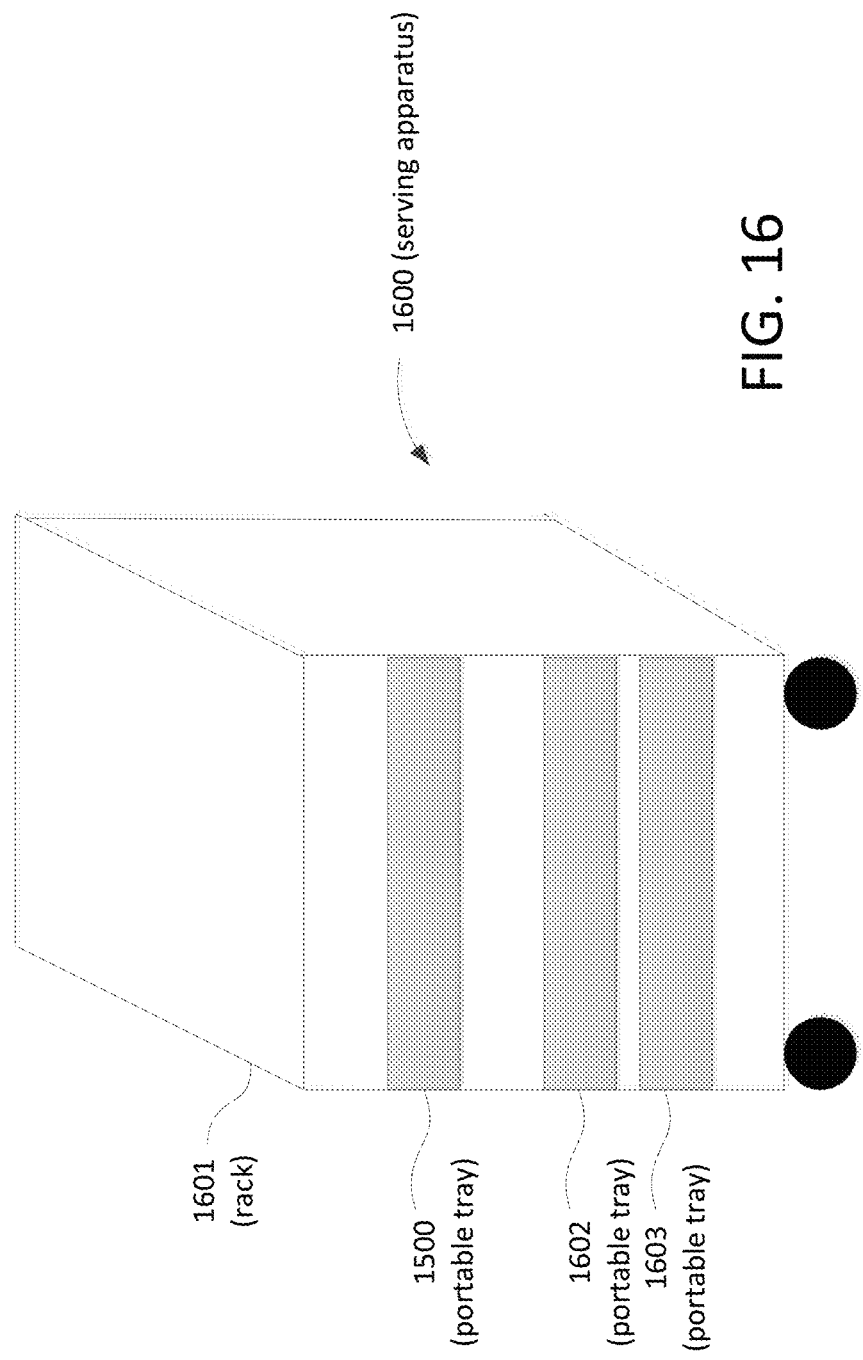
FIG. 16 shows a plurality of portable trays stacked in a rack in accordance with an embodiment.

FIG. 16 shows serving apparatus 1600 with a plurality of portable trays 1500 (as shown in FIG. 15) and 1602-1603 stacked in rack 1601 in accordance with an embodiment. Portable trays 1500 and 1602-1603 may be stacked into rack 1601 so that trays 1602-1604 can be transported to a desired location. In addition, rack 1600 provides a holding means (e.g., slots or shelves) so that the portable trays can be inserted into and removed from rack 1600.

In other embodiments, apparatuses and methods described herein provide, inter alia, systems for heating and serving food, components of such systems, and methods of heating and serving food.

Figure 17A:
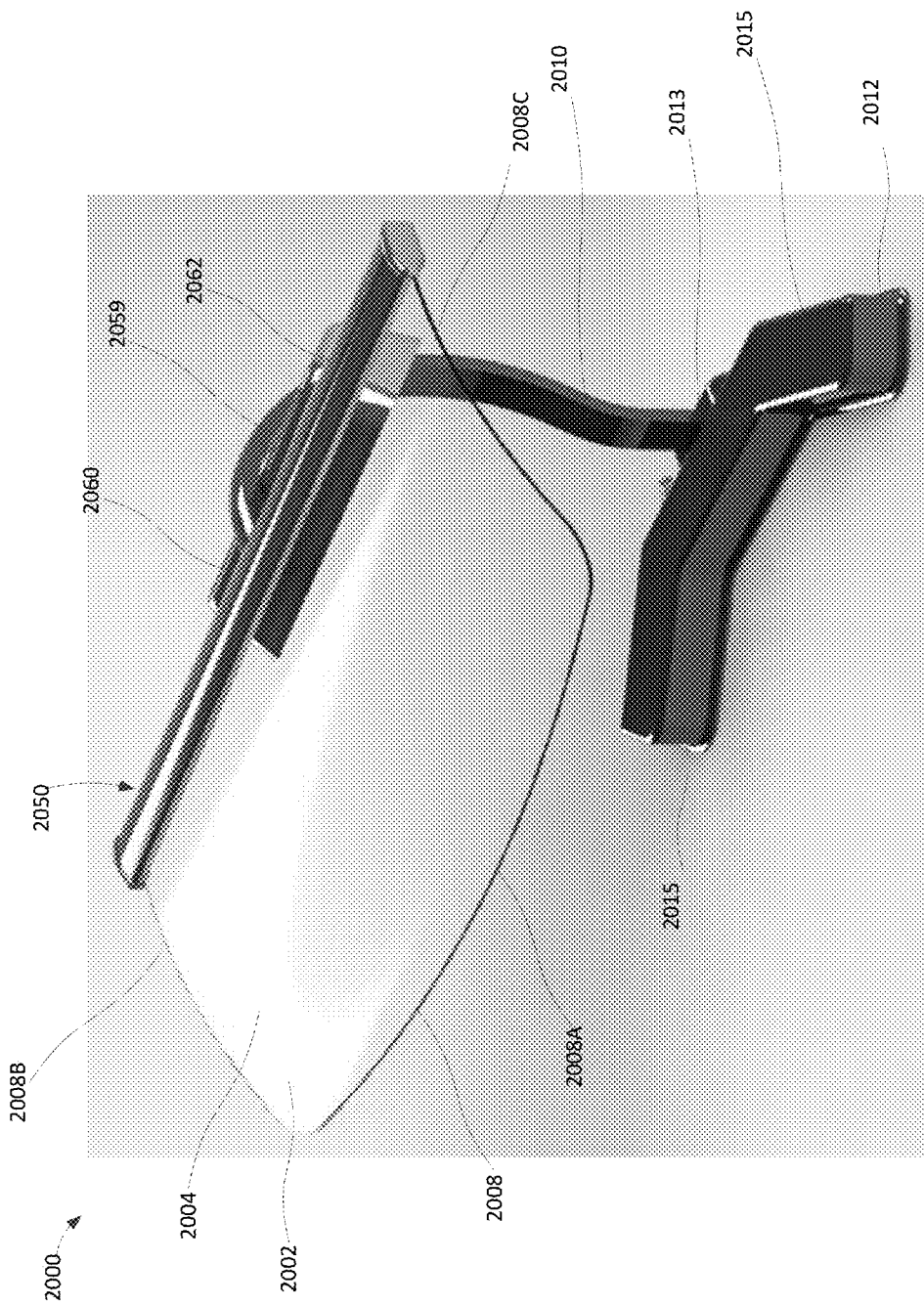
FIG. 17A shows a perspective view of an exemplary canopy for a food-serving system in accordance with one embodiment.
Figure 17B:
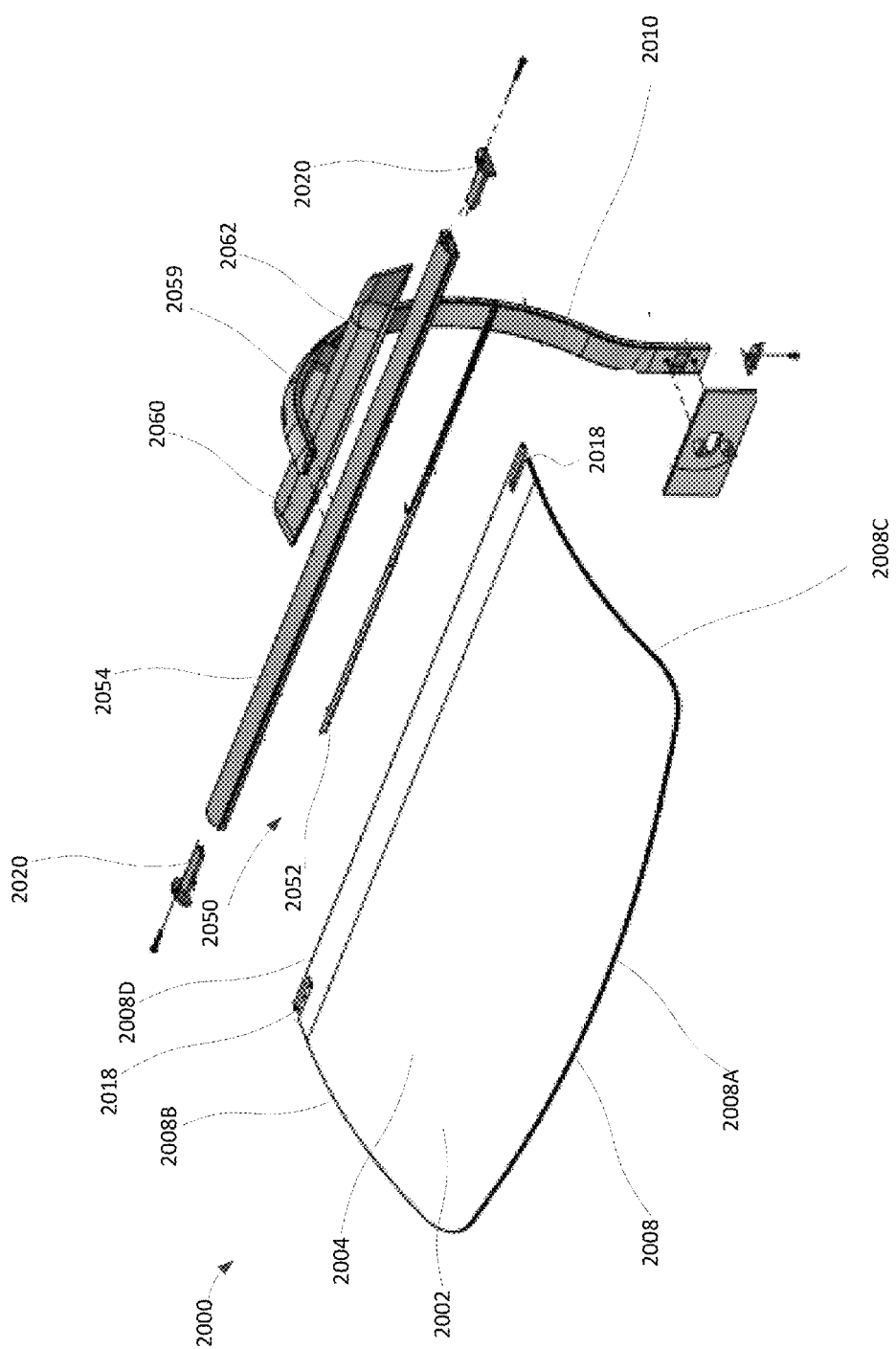
FIG. 17B shows an exploded perspective view of an exemplary canopy for a food-serving system in accordance with one embodiment.

Some aspects of the disclosure relate to a system which may be a food-serving or food-display system. In various other examples, the system may be used to heat and/or illuminate other kinds of objects. In some examples, the system is a unitary device, while in other embodiments the system may be modular and configured to fit and/or interact with one or more other devices and/or components. FIG. 17A shows a perspective view of an exemplary embodiment of a food display system 2000 and FIG. 17B shows an exploded perspective view of an exemplary embodiment of a food display system 2000. In the examples shown in FIGS. 17A and/or 17B, the food display system 2000 includes a canopy 2002, a base 2012, and a support 2010 holding the canopy over the base.

In some embodiments, the support 2010 may be stainless steel, while in others is a thermoplastic material. In certain embodiments, the support 2010 acts as a conduit to direct wiring to components of the canopy 2002 without making the wiring visible to the customer or user of the food-serving system. The support 2010 may be a variety of shapes, in some embodiments the support is partially, substantially, or entirely curved, while in others it comprises one or more straight sections which may include one or more angles between the straight sections. The support may be a variety of sizes as long as the canopy is ultimately held at an appropriate distance to access items under the canopy and/or be able to direct heat and/or light onto any objects or food items placed below the canopy 2002. In certain embodiments, the support holds the canopy approximately 18 inches above a ground level, while in others approximately 15-20 inches above a ground level, and in still others approximately 10 to 30 inches above a ground level.

The canopy 2002 may be a structure having a top surface 2004 facing upward or substantially away from the food to be displayed and a bottom surface 2006 facing downward or substantially toward the food to be displayed. The canopy 2002 may have an outer edge 2008 which may be comprised of multiple portions including for example a front edge 2008A, side edges 2008B and 2008C, and a back edge 2008D. The food display system 2000, including the canopy 2002, may be a variety of shapes and sizes as desired for atheistic appeal or otherwise. Thus, the canopy 2002, may have fewer or more edge portions than shown in FIGS. 17A and 17B.

In some examples, such as the examples of FIGS. 17A and 17B, the canopy 2002 may be curved with respect to its horizontal axis. In various examples, the canopy 2002 may be substantially shaped liked a section of a sphere or ellipse with the interior surface facing the food items. In other examples the canopy 2002 may be substantially flat, while in others it may comprise a plurality of flat surfaces at various angles to each other, such as in a three dimensional polygonal shape. In certain embodiments, the canopy 2002 or a section thereof may take the form of a prism, pyramid, cylinder, cone, sphere, ellipse, or a section of such a shape. In various examples, the canopy 2002 may be an irregular or undulating shape, and may be symmetric or asymmetric.

In some embodiments, the canopy 2002 is made of glass, ceramic, plastic or a combination thereof, and may be a sheet of one or more of these materials. In certain embodiments the canopy comprises a sheet of tempered glass. In other examples, the canopy may be an acrylic or polycarbonite. In certain examples, the canopy 2002 is colorless or substantially colorless. In various examples, the canopy 2002 may be partially or entirely translucent, for example embodiments having frosted, etched, engraved, or sandblasted glass. In certain examples, the canopy transmits and scatters about 80% or more of visible light, i.e. is "substantially translucent," in others about 90% or more, in others about 93% or more, i.e. is "translucent," and in still others about 95% or more. In certain embodiments, a design, image and/or text may be displayed on the canopy 2002 using translucent, tinted, or opaque materials. Additionally, in certain embodiments, and as will be discussed in greater detail below, a design, image and/or text may be etched into one of the top surface 2004 of the canopy or the bottom surface 2006 of the canopy.

In the example embodiments shown in FIGS. 17A and 17B, the food display system 2000, may include a light system 2050. The light system 2050 may include a light source 2052 and housing 2054. A variety of light sources may be used, and in some embodiments an incandescent light bulb, a compact florescent light bulb, or high-intensity discharge bulb or light emitting diode ("LED") may be used. As shown in FIG. 17B, the light source 2052 may be a light emitting diode ("LED") strip. A variety of bulbs, wattages or even number of light sources may be appropriate given the size, shape and other properties of the canopy and the food-serving system, and/or the desired visual aesthetic for the food items.

The light source 2052 may be adjacent to and/or engaged with one or more of edges 2008 of the canopy 2002. As shown for example in FIG. 17B, light source 2052 may be located adjacent the back edge 2008D of the canopy 2002. As shown in FIG. 17B, light source 2052 may be configured to provide light to back edge 2000D of the canopy 2002 and illuminate the other edge portions 2000A, 2000B, and 2000C of the canopy 2002. Additionally, the light source 2052 may be configured to illuminate a design, image and/or text etched into or otherwise on the canopy 2002. In embodiments where the canopy 2002 is transparent or substantially transparent, the contrast of edge lit edge surfaces may be especially aesthetically appealing. The edges 2008 may be rimless, and thus prominently display the edge lit characteristic when the light source 2052 is on, or may be partially or entirely covered with an ornamental rim, such as a tinted material. In some examples, the edge surface or surfaces may be facing downward towards the food items, horizontally toward a customer, or at another orientation such as an intermediate orientation. As will be discussed in greater detail below the light source 2052 may be configured to display one or more different colors. These colors may coordinate with the food to be displayed. For example, the color of the light source 2052 may enhance the visual appeal and aesthetic of food items and/or the light source may alert a user to the temperature of the food items. Additionally, the color of the light source 2052 may coordinate with a temperature of the food item. For example the light source 2052 may display a red or orange color for a warmed food item and a blue color for a cooled food item or if the heater is not in use. In some embodiments the light source 2052 may be able to illuminate multiple different color lights at the same time which may allow different portions of the canopy 2002 to illuminate in different colors and or different light intensities. For example, and as will be discussed in greater detail below, the light source 2052 may illuminate a portion of the canopy 2000 in red light over a food item that is heated and a portion of the canopy 2000 in blue light over a food item that is cooled. The light source 2052 may illuminate the canopy in any number of different colors and/or light intensities.

As shown in FIG. 17B, the light source 2052 may be engaged within the housing 2054 adjacent the back edge 2008D of the canopy 2002. In this configuration the light source 2052 may shine against the back edge 2008D of the canopy 2002. The canopy 2002 may be engaged with the housing. In some examples, the canopy 2002 may have cut-out portions 2018 on side edges 2008B and 2008C. The cut out portions 2018 may engage locking blocks 2020, and the locking blocks 2020 may engage the housing 2054. This configuration may thus engage the canopy 2002 with the housing 2054. As shown in FIGS. 17A and 17B, the housing 2054 may be engaged with the support 2010.

In some embodiments, as shown for example in FIGS. 17A, and 18A-B, the base 2012 may be configured to engage a table, floor, or other similar surface such that the canopy 2002 may be positioned over a food item or food serving vessel 2056. The base 2012 may have any suitable shape. For example, as shown in FIG. 17A the base may be configured to be located behind a food serving vessel 2056 and have a generally U-shaped structure having a base leg 2013 and two outer legs 2015 that project outward and forward from the base leg 2013. Alternatively as shown in FIGS. 18A and 18B, the base may be configured to be located behind a food serving vessel 2056 and have a generally rectangular shape. Alternatively as shown in FIGS. 19A-19C and 20A-20C, the base may be configured to rest under a food serving vessel 2056. The base 2012 shown in FIGS. 19A-19C, and 20A-20C has a generally rectangular shape having rounded corners however any suitable shaped base may be used including for example, elliptical, circular, triangular, square, hexagonal, octagonal, pentagonal, or a shape substantially similar to the food serving vessel 2056. Additionally, and as will be discussed in greater detail below, the base 2012 may be a heating and/or cooling unit, such as a Peltier device, an example of which is shown in FIGS. 21A-D and which is described in greater detail above.

The food display system 2000 may include one or more temperature change sources 2059 which may be located above, below, and/or at any other location such that the temperature change source 2059 may be capable of heating and/or cooling a food serving vessel 2056, food item, or other item above and/or below the ambient temperature. For example, the temperature change source 2059 may comprise one or more upper heating and/or cooling devices 2060 which may be located above a food serving vessel 2056 or item. By directing heat from above food items placed below the canopy in certain embodiments, these examples advantageously provide heat in a manner that allows a user to easily view and access the food items because, in certain implementations, there are no walls or doors between the customer and the food that extend down from the canopy positioned above the items. In these and/or other embodiments, there may be no need for a cover immediately above the food items to retain heat that a customer must remove, or that may prevent or inhibit a customer from viewing the items. Thus, it is envisioned in certain embodiments that the system is devoid of any walls or other enclosing structures in between the canopy and the food items. It also is envisioned in certain embodiments that the system is devoid of any cover placed immediately above the food items, for example a cover placed onto of a serving vessel containing the food. In addition, in certain embodiments the heat of the canopy is sufficient to prevent the collection of condensation from, e.g. steam from the food items, on the canopy that may otherwise inhibit a customer's view of the food items or simply lower the aesthetic appeal of the food-serving system.

For example, as shown in FIGS. 17A, 17B, 18A, and 18B the one or more upper heating devices 2060 may include a heat lamp of heat light 2062. The heat light 2062 may be an infrared heat light or other suitable heating light. As shown in FIGS. 17A, 17B, 18A, and 18B the heat light 2062 may be engaged with an upper portion of the support 2010. The heat light 2062 may be adjustable such that the food serving vessel 2056 may be heated to differing levels of heat.

In other examples, as shown for example in FIGS. 19A-C, 20A-20C, and 21A-21D the upper heating device 2060 may be a ceramic heater. As shown in FIGS. 19A-C, 20A-20C, and 21A-21D the ceramic heater 2064 may be engaged with an upper portion of the support 2010. The ceramic heater 2064 may be adjustable such that the food serving vessel 2056 may be heated to differing levels of heat.

As shown in the example embodiments of FIGS. 19A-19C, FIGS. 20A-20C, and FIGS. 21A-21D, the temperature change source 2059 may comprise one or more lower heating/cooling devices 2070 which may be below and/or adjacent a food serving vessel 2056 or food item. As shown, for example in FIGS. 19A-19C, and FIGS. 21A-21D the food display system 2000 may comprise a serving vessel 2056 and a lower heating device 2070 disposed beneath the serving vessel. In the example shown in FIGS. 19A-19C, the serving vessel 2056 is an upper serving vessel and the base further includes a lower serving vessel 2058. In embodiments with two or more serving vessels, any properties of, e.g., the upper serving vessel may be present in any other serving vessel, and vice versa. The base may be a single piece with integrated components, may comprise multiple components that interlock or nestle into one or more other components, as in this exemplary embodiment, or a combination thereof. In certain embodiments, the base comprises a serving vessel resting on top of a heating/cooling device 2070.

The serving vessel 2056 or vessels 2056 and 2058 may comprise any material appropriate for holding food items, including aluminum, stainless steel or other metals and/or alloys thereof. In some embodiments, the serving vessel comprises porcelain, stoneware, glass, cast iron, or a combination thereof. In certain embodiments, the serving vessel comprises a ferromagnetic material. The serving vessel may be a variety of shapes and sizes depending on the amount of food items served. In some examples, the serving vessel has a capacity of 5.8 quarts, while in others between about 5 and about 10 quarts, between about 2 and 5 quarts, between about 15 and 20 quarts, or about 20 or more quarts.

In various examples, the lower serving vessel 2058 serves as a water bath. In certain of these examples, the upper serving vessel 2056 may comprise slits or holes allowing steam or moist warm air from the water bath to heat the food items contained in the upper serving vessel. In this example, the lower heating/cooling device 2070 is disposed beneath the lower serving vessel 2058. The connection between the heating/cooling device 2070 and the serving vessel 2058 may be direct or indirect, as long as the connection ultimately allows for transfer of heat between the heating/cooling device 2070 and the serving vessel that holds the food items.

A variety of heating/cooling devices may be used for the lower heating/cooling device 2070. For example, the heating/cooling device 2070 may comprise a resistance heating coil, and in yet others it comprises a fuel that may be ignited to provide a flame. In certain embodiments, the heating device 2070 comprises an induction coil and the serving vessel or vessels comprise ferromagnetic materials that generate heat when placed onto an induction coil.

In other embodiments, the lower heating/cooling device 2070 and/or base 2012 may comprise any of the heating/cooling devices described in more detail above. For example, lower heating/cooling device 2070 and/or the base 2012 may include any of the Peltier devices and/or semi-conductor devices that provide similar heating and/or cooling characteristics described above.

In some embodiments the system 2000 may include one temperature change source 2059 (such as an upper heating/cooling device 2060 or a lower heating/cooling device 2070); a plurality of temperature change sources 2059 (such as an upper heating/cooling device 2060 and a lower heating/cooling device 2070); or no temperature change sources 2059.

In some examples, the canopy 2002 and/or support 2010 may further comprise one or more additional light sources 2092. In certain examples, additional light source may be a separate component that is adjacent to the canopy 2002 or support 2010, disposed above the canopy 2002, or otherwise positioned near the canopy 2002 or support such that it directs light onto the canopy 2002 and/or any food items below.

As mentioned above the system 2000 may also comprise an electrical source, such as the electrical junction box. In some embodiments, the electrical source is a portable electrical source (such as a battery) or some other direct source of power, while in others it is a junction box designed to provide electric current from a standard alternating current outlet. In some examples, the system is configured to run off of 120 volt alternating current. In some embodiments, the electrical source comprises one or more sockets. In embodiments with multiple sockets, a user may quickly easily create a daisy chain of multiple systems 2000 all running off the same power source, such as a single wall outlet providing alternating current. In various embodiments, the electrical source may be a component of the base 2012, support 2010, and/or canopy 2002, while in others it is a distinct component that is directly or indirectly connected to the system.

Figure 22A:
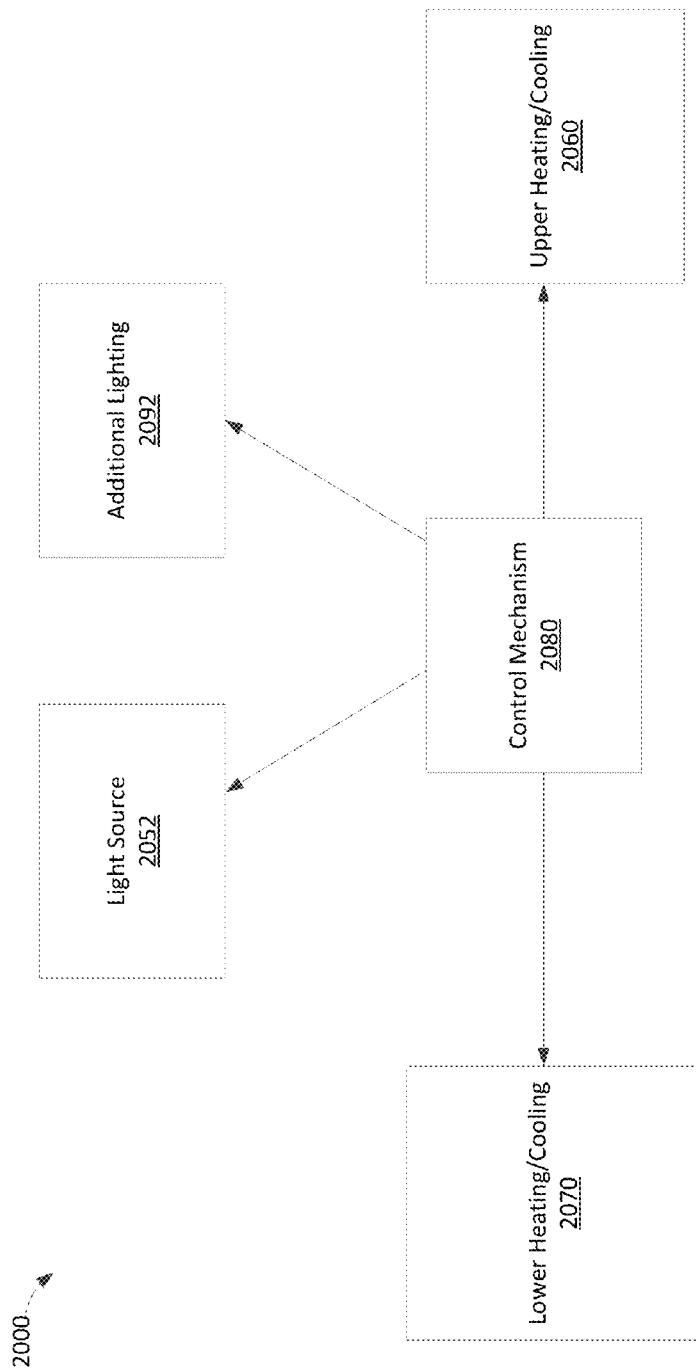
FIG. 22A shows a control device in accordance with an embodiment of the disclosure.

The food display system 2000 may also comprise one or more control mechanisms 2080. As shown in FIG. 22A, the one or more control mechanisms 2080 may control, for example, the light source 2052, the temperature change source(s) 2059 (including the upper heating/cooling devices 2060 and the lower heating/cooling devices 2070), and any additional light sources 2092.

In some embodiments, the control mechanisms 2080 for controlling the temperature change sources 2059 may include a rocker switches having a "heat" setting, "cool" setting and an "off" setting for temperature change sources 2059 that can heat and cool, or settings simply for "heat" and "off" for temperature change sources 2059 that can only heat an item. In other embodiments the control mechanisms 2080 for controlling the temperature change sources 2059 may have a "high heat" and "low heat" setting, a "low cool" setting, a "high cool" setting, and/or an "off" setting for temperature change sources 2059 that can heat and cool or settings simply for "high heat," "low heat," and "off" for temperature change sources 2059 that can only heat. In still other examples a control mechanism 2080 may be more variable allowing a user to select any reasonable hot and cold temperatures for the temperature change sources 2059. In certain embodiments, these settings may be configured to allow a user to selectively warm, cook and/or cool food items, for example by selecting a particular desired temperature, light intensity, or selecting a pre-set mode. In various examples, the control mechanism 2080 may allow a user to enter a particular temperature, for example using a keypad.

In some embodiments, there are multiple control mechanisms for various features of the system. For example, and as described above, there may be separate control mechanisms 2080 for the light source 2052 of the canopy 2002, the base heating/cooling device 2070, the upper heating device 2060, and any additional light or heating sources 2092. In certain embodiments, the control mechanism 2080 comprises one or more dials allowing a user to choose a temperature or light intensity along a continuum of possible values. In various examples, the control mechanism 2080 may comprise one or more switches, push buttons, keypads, and the like. In some embodiments, the control system has one or more timer mechanisms designed to operate one or more components of the system for a desired time interval. The control mechanism 2080 may also comprise circuitry configured to automatically shut off the system or particular components thereof after a certain amount of time, or when a certain temperature is exceeded. In certain examples, the control mechanism 2080 may be connected to one or more probes measuring the temperature of food items and/or a water bath.

In some examples the control mechanism 2080 for the temperature change sources 2059 may also control the light source 2052. For example, in some embodiments the light source 2052 may turn on when the temperature change source(s) 2059 is on. Additionally, in other embodiments the color of the light source 2052 may be controlled by the control mechanism 2080. In some embodiments, when the temperature change source 2059 is turned on and configured to heat or warm an item above ambient temperature the light source 2052 may emit a red light. The red light may have a wavelength of about 600 nm to about 665 nm or the red light may have a color temperature of below 2400 K. Similarly, in some embodiments, when the temperature change source 2059 is turned on and configured to cool an item below ambient temperature the light source may emit a blue light. The blue light may have a wavelength of about 430 nm to about 525 nm or the blue light may have a color temperature of above 6000 K. In some embodiments, the intensity of the light source 2052 may also correspond to the temperature change source 2059. Thus, in some examples, the light source 2052 may be brighter when the temperature change source 2059 is set to higher heat or cool setting than when it is set to a lower heat or cool setting.

In still other embodiments, there may be separate control mechanisms 2080 for the temperature change source 2059 and the light source 2052. In such embodiments, the control mechanism 2080 for the light source 2052 may allow a user to select various colors for the light source 2052. For example, in some embodiments, red LEDs can have a wavelength of about 620 nm-625 nm, dark red LEDS can have a wavelength of about 660 nm-665 nm, red-orange LEDS can have a wave length of about 610 nm-620 nm, green LEDs can have a wavelength of about 520 nm-550 nm, cyan LEDS can have a wavelength of about 490 nm-520 nm, blue LEDs can have a wavelength of about 465 nm-470 nm, dark blue LEDs can have a wavelength of about 455 nm-460 nm, warm white light LEDs can have more red wavelengths and are rated in color temperatures of about 2,000-4,000 K, and cool white light LEDs can have more blue wavelengths are rated in color temperatures of about 5,000-10,000K. In addition to adjusting the color of the light 2052, the control mechanism 2080 may also adjust the intensity of the light. Thus, a user may be able to adjust the brightness of the light source 2052.

Figure 22B:
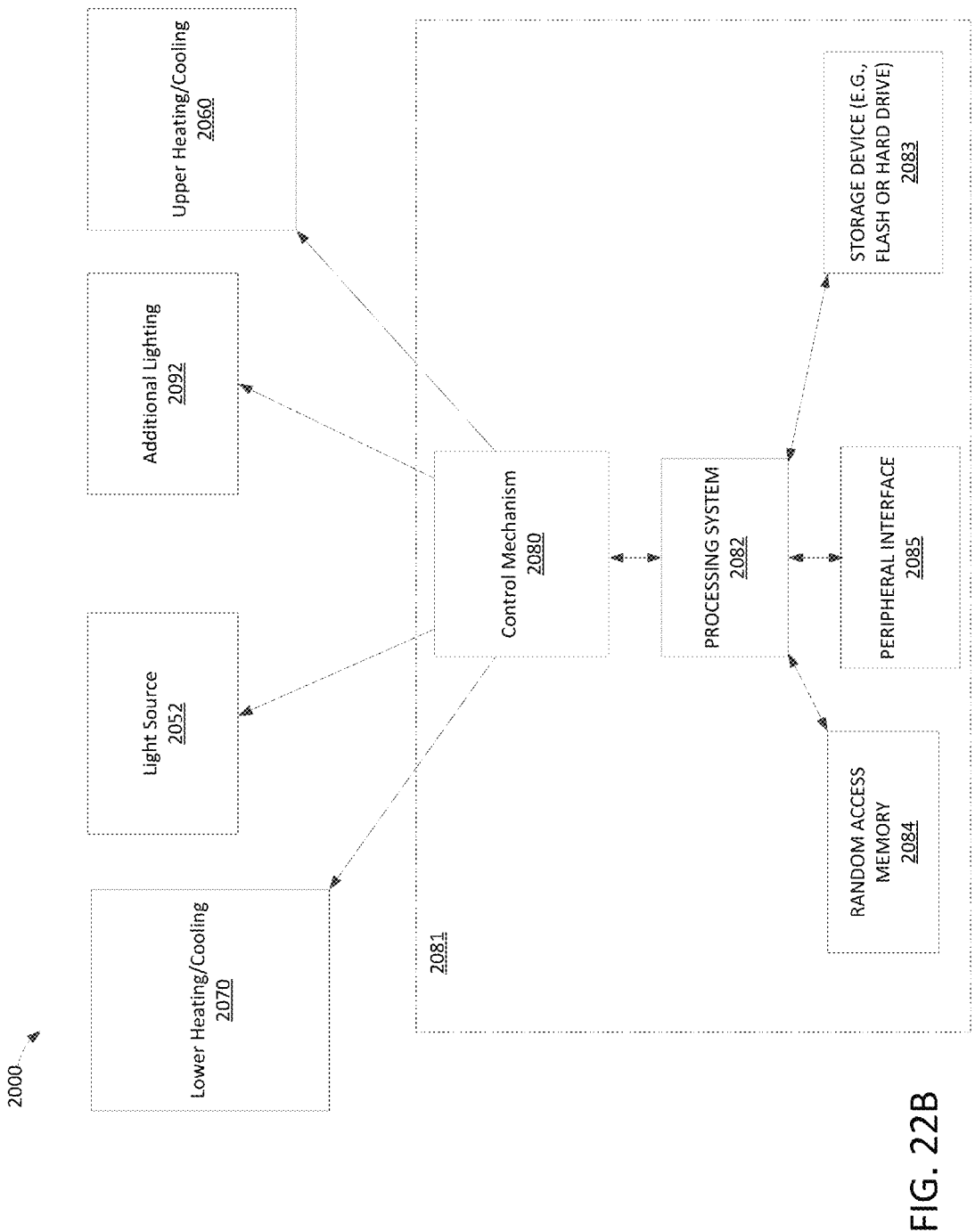
FIG. 22B shows a control device in accordance with an embodiment of the disclosure.

FIG. 22B shows control device 2081 for controlling control mechanism 2080. In some embodiments, control device 2081 may be the same or similar to control device 600 discussed above. Processing system 2082 may execute computer executable instructions from a computer-readable medium (e.g., storage device 2083) in order provide verify communication redundancy for a network, Memory 2084 is typically used for temporary storage while storage device 2083 may comprise a flash memory and/or hard drive for storing computer executable instructions and a profile image. However, computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing system 2081. The executable instructions may carry out any or all of the method steps described herein.

With some embodiments, processing system 2082 may correspond to one or more processors and storage device 2083 may correspond to one or more memories.

Control device 2081 may be implemented as one or more ASICs or other integrated circuits (e.g., a single chip computer) having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

As shown in FIG. 22B, control device 2081 may control the light source 2052, the temperature change sources 2059 (including the upper heating/cooling devices 2060 and the lower heating/cooling devices 2070), and any additional light sources 2092. A user may control the light source 2052, the temperature change sources 2059 (including the upper heating/cooling devices 2060 and the lower heating/cooling devices 2070), and any additional light sources 2092 through a peripheral interface 2085. Similar to the examples discussed above, in some embodiments the color of the light source 2052 may correspond to a temperature of the temperature control sources 2059. Additionally, with some embodiments, control device 2081 supports different control capabilities for heating and/or cooling. For example, in some embodiments, control device 2081 may obtain a temperature setting (desired temperature) from a user through an input device and control one or more temperature change sources 2059 to compensate for environmental factors in order to approximate the desired temperature.

In various examples the control mechanism 2080 and/or control device 2081 may be directly connected to the electrical source, while in others it is indirect connected or functions remotely from the electrical source. The remote connections may utilize radio waves, a paired infrared emitter and sensor, or another type of wireless connection. In some of these examples, the control mechanism is at the front of the food-serving system to allow a user to easily control the system.

In some embodiments, the base 2012, canopy 2002 and support 2010 are connected to form a single unit, while in others may constitute two or more separate components that are assembled for use. Even if fully assembled, the system 2000 may be sized such that a user could easily transport the system and set up the portable food display system 2000 in a desired location. For example, in some embodiments the system 2000 is approximately 15 pounds or less. In various embodiments the food display system 2000 is less than two feet in any dimension, thus allowing a use to easily store, transport, and set-up the system, or multiple units of the system, as desired. In certain embodiments, the food display system 2000 may comprise part of a table, counter, or other structure, and in some examples components or all of the systems may be designed to be permanently attached to the other structure. In some examples, the food display system 2000 may be part of a cart or other mobile structure designed to allow a user to quickly set-up food display system 2000 in a desired location.

As described above, in some embodiments the light source 2052 may capable of illuminating multiple different color lights at the same time, which may allow portions of the canopy 2002 to illuminate in different colors and/or different light intensities. Such an embodiment of the system 2000 may be particularly advantageous when used with a serving apparatus having a heating side and a cooling side similar to serving apparatus 1300 described above.

Figure 23:
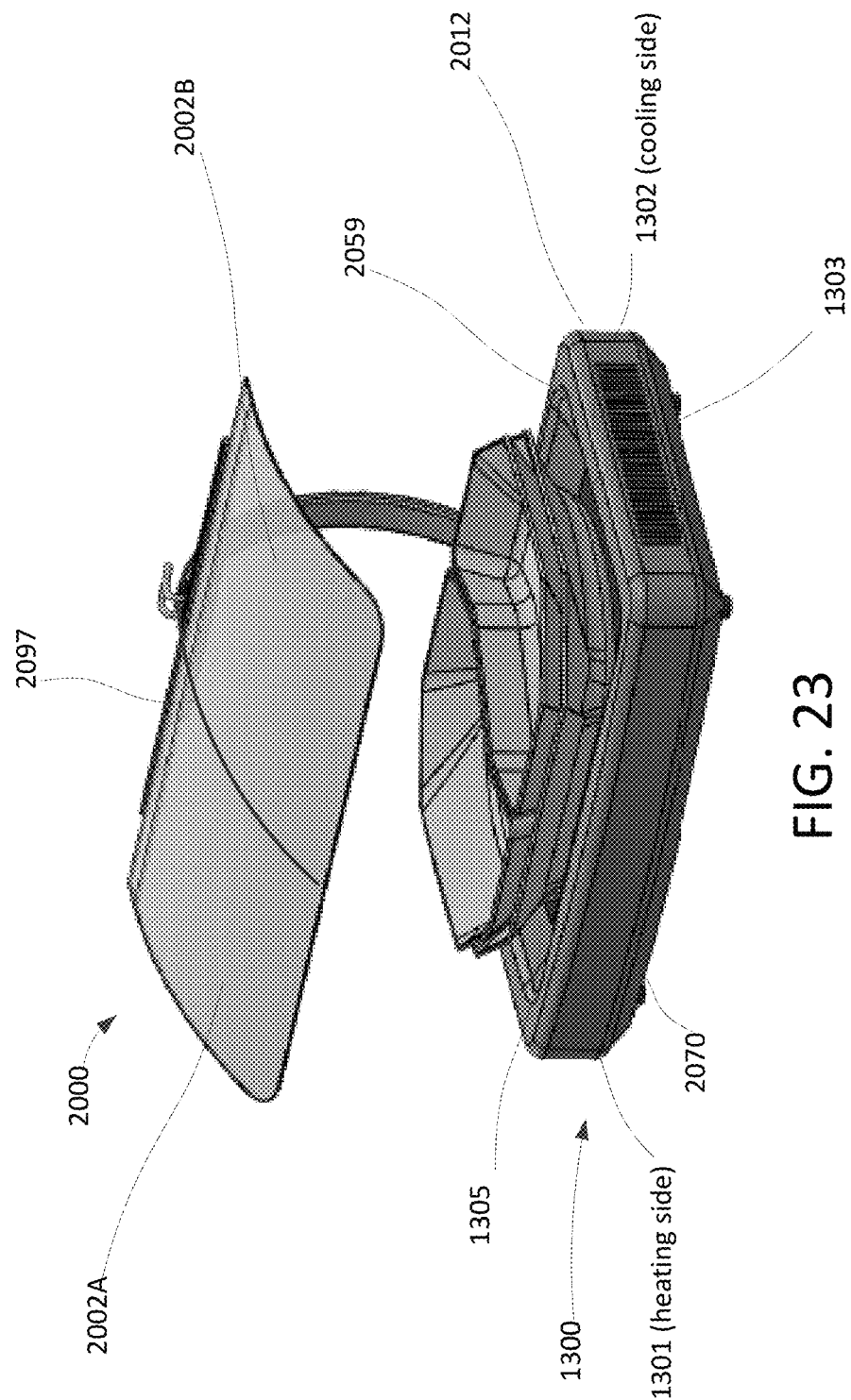
FIG. 23 shows a perspective view of an exemplary embodiment of a food-serving system.

As shown in FIG. 23, and as described above, serving apparatus 1300 may have a heating side 1301 and a cooling side 1302 in accordance with an embodiment which may operate at the same time so that heating serving surface 1305 may be heating one food item (e.g., hot cereal for breakfast) while cooling serving surface 1303 may be simultaneously cooling another food item (e.g., orange juice, fruit, yogurt, etc. for breakfast). As described above, the cooling surface 1303 may be cooled by a first Peltier device and the heating surface 1305 may be heated by a second Peltier device; the first and second Peltier devices may have one or more heat pipes between them.

The canopy may have a first portion 2002A and a second portion 2002B. The light source 2052 may provide light to the edge 2008 of each portion 2002A and 2002B of the canopy 2002. In such embodiments the light source 2052 may have any configuration capable of supplying light having different characteristics, such as lights having different color characteristics, to each of the two portions 2002A and 2002B of the canopy. For example, in some embodiments, the light source 2052 may be a first light having a first color providing light to section 2002A and a second light having a second color providing light to section 2002B. In other embodiments the light source 2052 may be a LED light strip capable of illuminating the first and second portions 2002A and 2002B with different colors and/or intensities. In some, examples, each section may have a plurality of lights of different colors and/or intensities, and these are configured to be selectively illuminated based on the current usage of the unit (e.g. by a light controller that a user operates, or by set instructions based on selected temperatures for the unit below the canopy section). In some embodiments, the canopy 2002, may include an optional divider 2097 between the first portion 2002A and 2002B which may separate the light provided to the portions 2002A and 2002B of the canopy 2002.

In some embodiments, the light source 2052 may illuminate a portion of the canopy 2000 in red light over a food item that is heated and a portion of the canopy 2000 in blue light over a food item that is cooled. Each of the separate canopy sections 2002A and 2002B may be illuminated in any number of different colors and/or light intensities. Additionally, although two canopy sections are shown in FIG. 23 any number of different canopy sections may be utilized. In embodiments with more than two canopy sections, at least a front edge of each section is illuminated by the appropriate light source. In some examples, multiple canopies may be used above multiple Peltier units (e.g. a separate lighted canopy above one heating Peltier unit, and a separate lighted canopy above a cooling Peltier unit, or multiple hot Peltier units, multiple cold Peltier units, or combinations thereof). In certain examples, one or more heat pipes are used for the multiple Peltier units as described herein. The Peltier units may be part of a single base, or may be in separate base modules for different food items. In some examples, the system may comprise multiple smaller canopies (e.g. relatively thin canopies, such as those 8 inches wide or less, 12 inches wide or less, or 18 inches wide or less) disposed above one or more Peltier units. In certain embodiments, the system may comprised multiple canopy sections (e.g. roughly rectangular shaped sections) that are connected at the front edge, to provide an discrete lighting section for various food items (e.g. with a distinct lit, side edge) but still have a continuous surface at the front to promote sanitary conditions (e.g. the front six, twelve, or eighteen inches are a continuous surface extending the width of the overall serving area, with individual rear sections, having dividing space in between them, extending back to a light source).

As can be appreciated by one skilled in the art, a system with an associated computer-readable medium containing instructions for controlling the computer system may be utilized to implement the exemplary embodiments that are disclosed herein. The computer system may include at least a microprocessor, a digital signal processor, and associated peripheral electronic circuitry. In some examples, such systems comprise temperature control module(s) and light control module(s) (where these may be combined into a single module) including one or components described here.

While the disclosure has been described with respect to specific examples including presently preferred modes of carrying out the disclosed systems, apparatuses, methods, etc., those skilled in the art will appreciate that there are numerous variations and permutations of the above described systems and techniques that fall within the spirit and scope of the disclosure as set forth in the appended claims.

What is claimed is:

1. A food display system, the display system comprising:
a base;
a support engaged with the base;
a canopy supported by the support, the canopy having a top surface, a bottom surface, and an edge surface between the top and bottom surfaces, the edge surface having at least a first portion and a second portion; and
a light source configured to provide light to the first portion of the edge surface of the canopy and illuminate the second portion of the edge surface of the canopy;
wherein the canopy is configured to be located above a food item.

2. The food display system of claim 1, further comprising a design etched into one of the top surface of the canopy or the bottom surface of the canopy, wherein the light source is configured to illuminate the design.

3. The food display system of claim 1, further comprising a temperature change source configured to affect temperature of the food item.

4. The food display system of claim 3, wherein the temperature change source is located substantially above the food item and is configured to warm the food item.

5. The food display system of claim 4, wherein the light source is configured to emit a red light when the temperature change source is on.

6. The food display system of claim 5, wherein the red light has a wavelength of about 600 nm to about 665 nm.

7. The food display system of claim 4, wherein the light source is configured to emit a blue light when the temperature change source is off.

8. The food display system of claim 7, wherein the blue light has a wavelength of about 430 nm to about 525 nm.

9. The food display system of claim 4, wherein the temperature change source is an infrared light.

10. The food display system of claim 4, wherein the temperature change source is ceramic heater.

11. The food display system of claim 3, wherein the temperature change source is located substantially below the food item.

12. The food display system of claim 11, wherein the temperature change source comprises at least one cooling Peltier device configured to cool the food surface below an ambient temperature and at least one heating Peltier device configured to heat the food surface above the ambient temperature.

13. The food display system of claim 12, wherein the light source is configured to emit a blue light when the cooling Peltier device is activated and configured to emit a red light when the heating Peltier device is activated.

14. The food display system of claim 13, wherein the blue light has a wavelength of about 430 nm to about 525 nm and the red light has a wavelength of about 600 nm to about 665 nm.

15. The food display system of claim 13, further comprising a first portable electrical source configured to provide electrical power to the at least one Peltier device and the at least one light source.

16. The food display system of claim 13, wherein the light source is configured to emit a red light and a blue light.

17. The food display system of claim, 16 wherein the blue light has a wavelength of about 430 nm to about 525 nm and the red light has a wavelength of about 600 nm to about 665 nm.

18. The food display system of claim 13, wherein the at least one cooling Peltier device is configured to cool the food surface below an ambient temperature or heat the food surface above the ambient temperature.

19. The food display system of claim 18, wherein the light source is configured to emit a red light when the Peltier device is heating the food surface above the ambient temperature, and wherein the light source is configured to emit a blue light when the Peltier device is cooling the food surface below the ambient temperature.

20. A food display system, the display system comprising:
a base, the base comprising:
a top surface, the top surface comprising one or more serving surfaces supported by the base; and
at least one Peltier device contained within the base and configured to change a temperature of at least one of the one or more serving surfaces; and
a support engaged with the base;
a canopy supported by the support, the canopy having a top surface, a bottom surface, and an edge surface between the top and bottom surfaces, the edge surface having at least a first portion and a second portion; and
a light source configured to provide light to the first portion of the edge surface of the canopy and illuminate the second portion of the edge surface of the canopy.

21. A food display system, the display system comprising:
a base;
a support engaged with the base;
a canopy supported by the support, the canopy having a top surface, a bottom surface, and an edge surface between the top and bottom surfaces, the edge surface having at least a first portion and a second portion; and
a light source configured to provide light to the first portion of the edge surface of the canopy and illuminate the second portion of the edge surface of the canopy;
a temperature change source configured to raise the temperature of the food item above an ambient temperature;
wherein the light source is configured to emit a red light having a wavelength of about 600 nm to about 665 nm; and
wherein the canopy is configured to be located above a food item.

22. The food display system of claim 21, wherein the temperature change source is also configured to lower the temperature of the food item below the ambient temperature;

and wherein the light source is also configured to emit a blue light having a wavelength of about 430 nm to about 525 nm.

* * * * *